US010013156B2

(12) United States Patent
Takehara

(10) Patent No.: US 10,013,156 B2
(45) Date of Patent: Jul. 3, 2018

(54) INFORMATION PROCESSING APPARATUS, INFORMATION PROCESSING METHOD, AND COMPUTER-READABLE RECORDING MEDIUM

(71) Applicant: Ken Takehara, Kanagawa (JP)

(72) Inventor: Ken Takehara, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 355 days.

(21) Appl. No.: 14/592,288

(22) Filed: Jan. 8, 2015

(65) Prior Publication Data
US 2015/0212713 A1 Jul. 30, 2015

(30) Foreign Application Priority Data

Jan. 27, 2014 (JP) .................................. 2014-012871
Oct. 8, 2014 (JP) .................................. 2014-207499

(51) Int. Cl.
G06F 3/048 (2013.01)
G06F 3/0484 (2013.01)

(52) U.S. Cl.
CPC ...... *G06F 3/04845* (2013.01); *G06F 3/04842* (2013.01); *G06F 2203/04803* (2013.01)

(58) Field of Classification Search
CPC ............. G06F 3/04845; G06F 3/04842; G06F 2203/04803
See application file for complete search history.

(56) References Cited

U.S. PATENT DOCUMENTS

| 8,230,359 | B2* | 7/2012 | Robertson | G06F 3/0481 715/798 |
| 2008/0162031 | A1* | 7/2008 | Okuyama | G01C 21/367 701/532 |
| 2012/0316782 | A1* | 12/2012 | Sartipi | G01C 21/367 701/455 |
| 2013/0239055 | A1* | 9/2013 | Ubillos | H04L 51/24 715/815 |
| 2014/0078181 | A1* | 3/2014 | Harada | G09G 5/373 345/661 |
| 2015/0143488 | A1 | 5/2015 | Takehara et al. | |

FOREIGN PATENT DOCUMENTS

JP 2013-039701 2/2013
JP 2015-122058 A 7/2015

* cited by examiner

*Primary Examiner* — Anil N Kumar
(74) *Attorney, Agent, or Firm* — Harness, Dickey & Pierce, P.L.C.

(57) ABSTRACT

An information processing apparatus includes a display controller that enlarges or reduces an image within a second area specified in a first area of an image including at least one object at such a display magnification that the image within the second area fits in the size of a display area, thereby displaying the resultant image in the display area, a position storage that stores a position on the image within the second area, and a converter that converts the size of the second area within the first area. When the display magnification is equal to or greater than a threshold, the display controller displays a first symbol at the position in the display area and, when the display magnification is less than the threshold, the display controller erases the first symbol and displays at the position a second symbol for indicating the position in the display area.

12 Claims, 19 Drawing Sheets

| STAMP TYPE | COORDINATES |
|---|---|
| SETTLED | (300, 450) |
| PENDING | (1200, 2500) |
| PENDING | (20, 3000) |
| CHECK | (500, 400) |
| NOTE | (4500, 25) |
| CHECK | (1000, 900) |

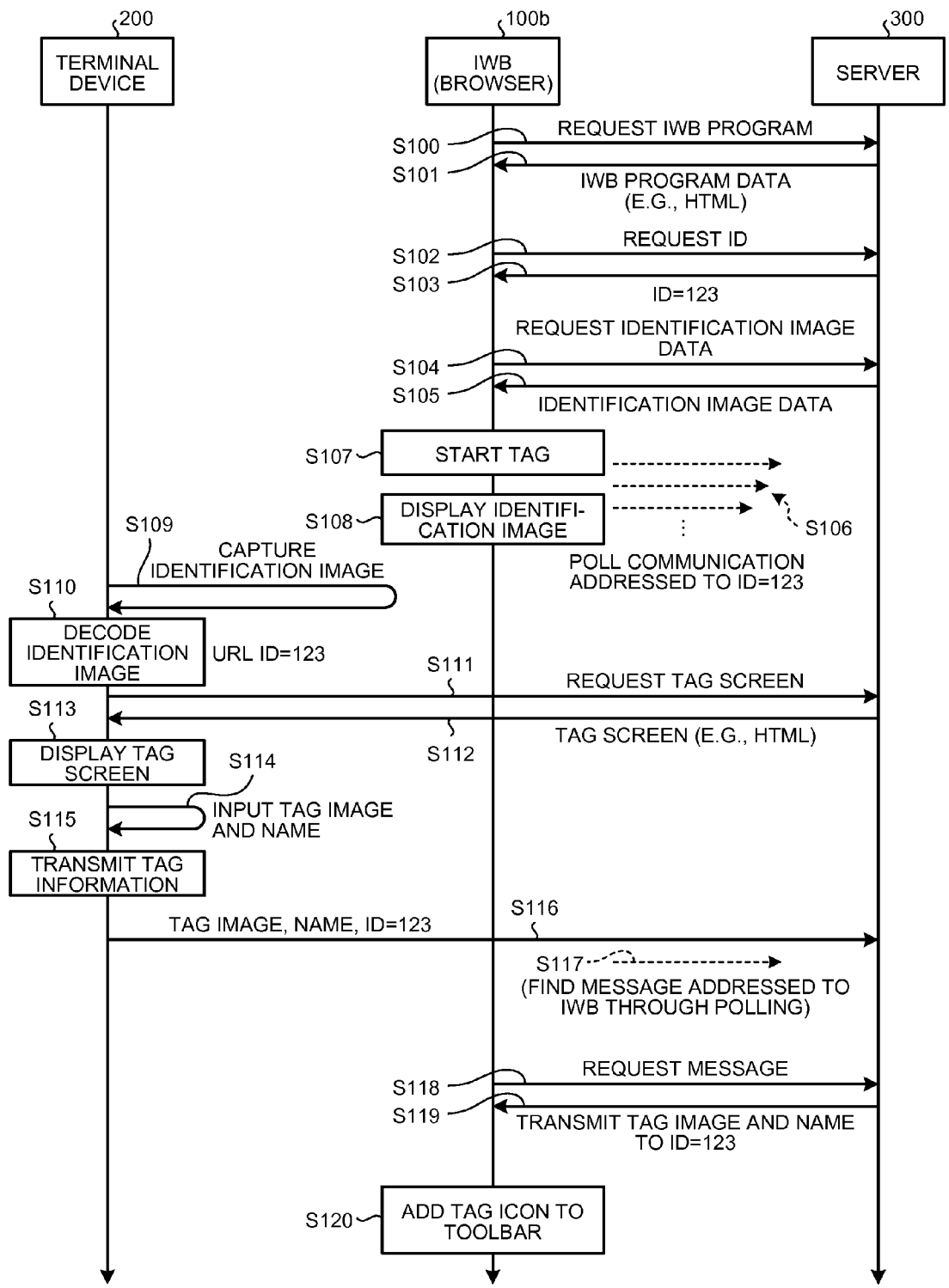

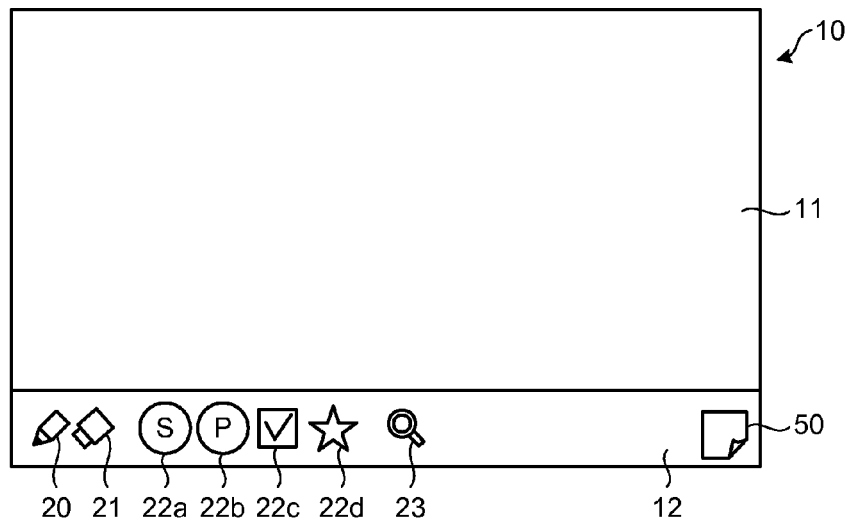
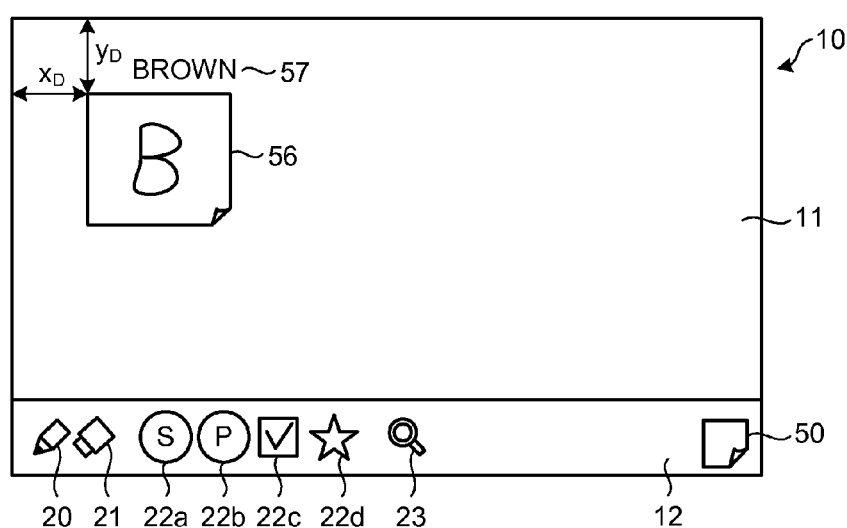
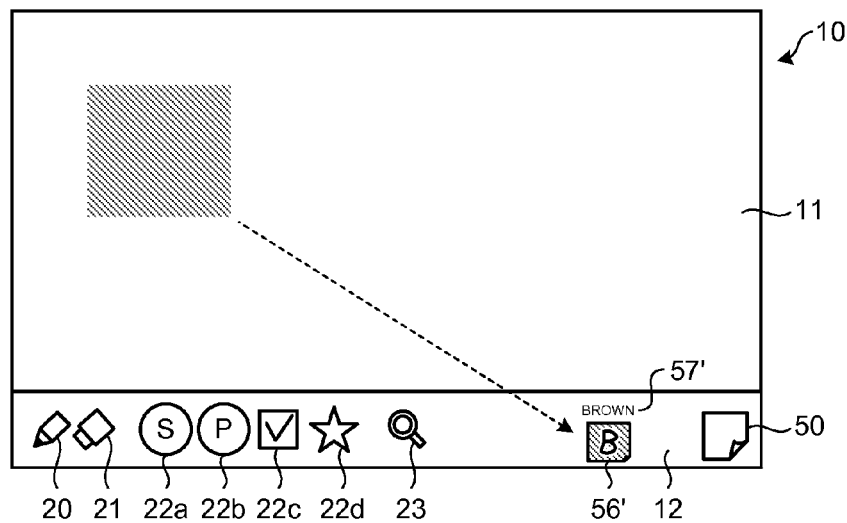

INFORMATION PROCESSING APPARATUS, INFORMATION PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-012871 filed in Japan on Jan. 27, 2014 and Japanese Patent Application No. 2014-207499 filed in Japan on Oct. 8, 2014.

BACKGROUND OF THE INVENTION

1. Field of the Invention

The present invention relates to an information processing apparatus, an information processing method, and a computer-readable recording medium suitable for use in displaying information.

2. Description of the Related Art

Conventionally, electronic blackboard apparatuses that display board-written information as image data (hereinafter referred to as interactive whiteboards (IWBs)) have been developed (see, for example, Japanese Laid-open Patent Publication No. 2013-39701). An IWB is typically configured as a touch panel that includes a front board surface integrating a display device and a pointing device and that outputs a signal corresponding to a position touched on the board surface. For example, the IWB acquires, as image data, information written on the board surface by a user using, for example, a dedicated pen through their touch panel function, thereby displaying the information on the display device that includes the board surface.

A conventional whiteboard that is not electronized has at most an obverse surface and a reverse surface of the whiteboard for a board area to be written on, thereby limiting an amount of information to be written on the board. In contrast, with the IWB, the board area to be written on can be provided up to a permissible range in the coordinate system of the system, so that the IWB is capable of handling a large amount of board-written information as compared with conventional whiteboards. In addition, the IWB can save board-written information in a recording medium and read the saved board-written information from the recording medium to re-display the information on the board surface.

As such, the IWB offers greater convenience relative to conventional whiteboards that are not electronized.

Exemplary applications of the whiteboard are very often found in cases in which any empty space is selected for board writing from within the board area to be written on. When a large board area to be written on is set in the IWB in such exemplary applications, it is difficult to find target information within the board area to be written on and the exemplary applications lack convenience.

Therefore, there is a need for an IWB that offers even greater convenience.

SUMMARY OF THE INVENTION

It is an object of the present invention to at least partially solve the problems in the conventional technology.

There is provided an information processing apparatus that includes a display controller that enlarges or reduces an image within a second area specified in a first area of an image including at least one object at such a display magnification that the image within the second area fits in a size of a display area, to display the resultant image in the display area; a position storage that stores therein a position on the image within the second area, the position being specified by a user input with respect to the second area; and a converter that converts a size of the second area within the first area according to the user input. When the display magnification is equal to or greater than a threshold, the display controller displays a first symbol at the position in the display area and, when the display magnification is less than the threshold as a result of a conversion of the size of the second area by the converter, the display controller erases the first symbol and displays at the position a second symbol for indicating the position in the display area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is a sequence chart illustrating exemplary operations of the information sharing system according to the second embodiment;

FIGS. 27A to 27C are diagrams illustrating exemplary screens in an IWB according to a modification of the second embodiment.

DETAILED DESCRIPTION OF THE PREFERRED EMBODIMENTS

The following describes in details with reference to the accompanying drawings information processing apparatuses, information processing methods, and information processing programs according to embodiments of the present invention.

First Embodiment

The first embodiment will be described. The first embodiment relates to a method for controlling display of an icon image to be displayed in association with specific details drawn on an electronic blackboard apparatus (hereinafter referred to as an interactive whiteboard (IWB)).

The IWB includes, for example, a liquid crystal display (LCD) as a display device that forms a display unit and a touch panel structure integrating the display unit with an input device that outputs a signal corresponding to a touched position. Specifically, a user can touch (tap) a display surface of the IWB as instructed on the display unit to thereby cause the IWB to perform processing according to the tapped position.

Stamp Display According to the First Embodiment

Figure 1:
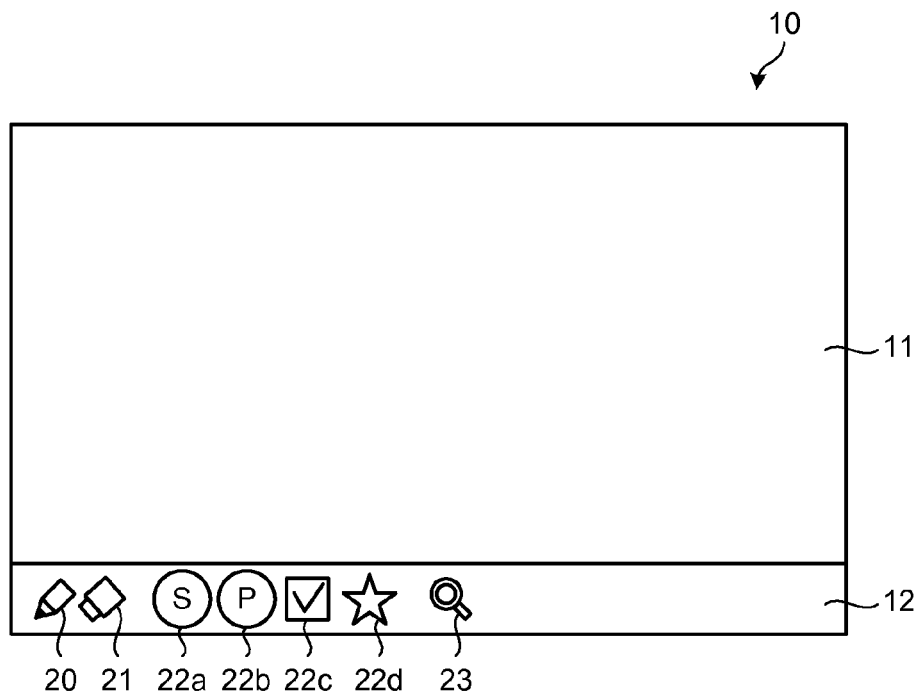
FIG. 1 is a diagram illustrating an exemplary initial display screen that appears on a display unit of an IWB according to a first embodiment of the present invention.

FIG. 1 illustrates an exemplary initial display screen that appears on the display unit of the IWB according to the first embodiment. In FIG. 1, the display unit of the IWB includes a display area 10. The display area 10 includes a drawing area 11 defined at an upper portion of the display area 10 and a toolbar 12 defined at a lower portion of the display area 10. The toolbar 12 displays various types of icons. Specifically, the toolbar 12 displays icon images 20, 21, 22a to 22d, and 23 that serve as symbols for selecting specific types of processing to be performed on the drawing area 11.

Figure 2:
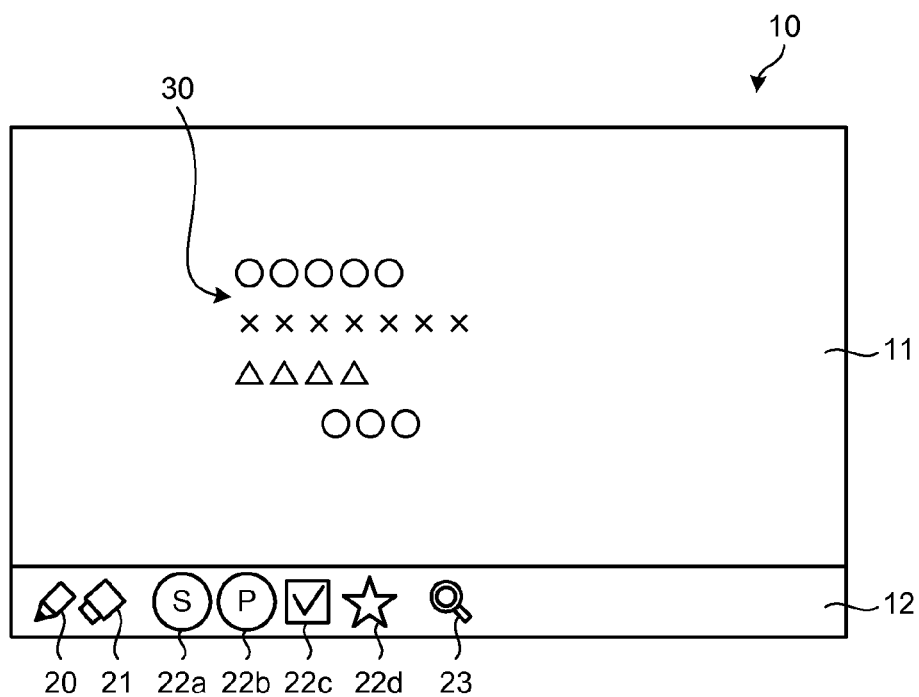
FIG. 2 is a diagram illustrating an example of a character string object drawn on a display area after selection of an icon image.

Of the icon images displayed on the toolbar 12, the icon image 20 is selected for drawing on the drawing area 11. For example, the user may tap to select the icon image 20 and then trace an area within the drawing area 11 with, for example, a finger. This action by the user results in an image being drawn along a trajectory traced by the finger. FIG. 2 illustrates an example of a character string object 30 formed by drawing an image in the drawing area 11 after selection of the icon image 20.

The icon image 21 is selected when part of an image drawn in the drawing area 11 is to be erased. For example, tapping to select the icon image 21 and then tracing the abovementioned object 30 with the finger erases portions of the object 30 along the traced trajectory.

The image is described, for example, in a scalable vector graphics (SVG) format that uses a coordinate system defined in the drawing area 11. Rendering of the image is not limited to the foregoing and bitmap may be used to represent the image.

The icon images 22a to 22d each set a marker on the contents drawn in the drawing area 11. An image having a predetermined meaning can be used for the marker. For example, the user taps any desired icon image (e.g., the icon image 22a) out of the icon images 22a to 22d and then taps any desired position within the drawing area 11. This enables display of the icon image 22a at the tapped position within the drawing area 11. The IWB associates information on the tapped position for displaying the icon image 22a with information indicating the type of the icon image 22a and stores these two pieces of information associated with each other in a memory.

In the example of FIG. 1, a character "S" indicating "Settled" is displayed for the icon image 22a and a character "P" indicating "Pending" is displayed for the icon image 22b. Additionally, the icon image 22c represents a check item and a check box is displayed for the icon image 22c. For example, tapping the icon image 22c selected from the toolbar 12 and displayed on the drawing area 11 causes a check mark in the icon image 22c to be displayed or hidden. The icon image 22d may be used, for example, to indicate that the item is noteworthy. In the following, the icon images 22a to 22d will be referred to as stamps 22a to 22d unless otherwise specified.

The icon image 23 is for changing the display of the drawing area 11 to a stamp map display. The stamp map display will be described later.

Figure 3:
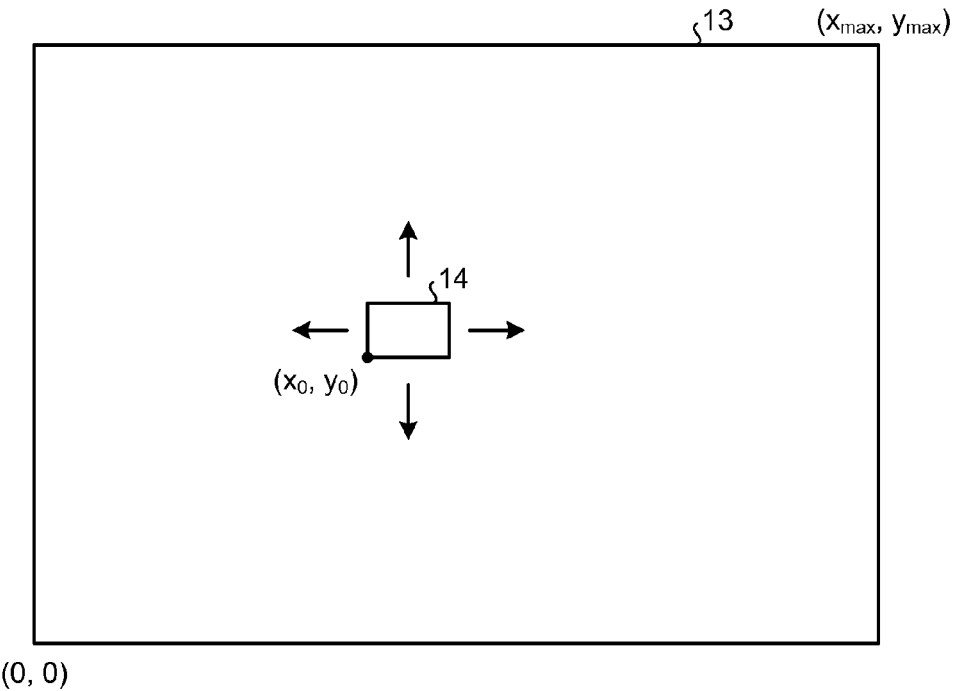
FIG. 3 is a diagram illustrating an exemplary coordinate system for the display area to be applied to the first embodiment.

FIG. 3 illustrates an exemplary coordinate system for the drawing area 11 to be applied to the first embodiment. The IWB can define, as a drawable first area, for example, an area having a maximum size to be defined by a system that achieves the functions of the IWB. FIG. 3 illustrates a rectangular area having coordinates (0, 0) and coordinates $(x_{max}, y_{max})$ as opposite angles for a definition area 13 as the first area that depends on the area having the maximum size.

In FIG. 3, a window area 14 as a second area is included in the definition area 13 and defined to be smaller in size than the definition area 13. The example of FIG. 3 illustrates that the window area 14 is defined at a position having coordinates $(x_0, y_0)$ as an origin. Specifically, the window area 14 is defined as a window within the definition area 13, so that a rectangular image having a size specified for the window area 14 is cut out from the entire image of the definition area 13 with predetermined coordinates $(x_0, y_0)$ as the origin.

The drawing area 11 displays a rectangular image within the window area 14 that has been resized to fit in the size of the drawing area 11. Assume, for example, that the drawing area 11 has a fixed size of 800 pixels by 600 pixels and the window area 14 has 1200 pixels by 900 pixels. The drawing area 11 then displays an image that represents the image of the window area 14 resized by reduction at a display magnification of ⅔ in horizontal and vertical directions. It is noted that the display magnification is greater than 1 when the original image is to be enlarged and is less than 1 when the original image is to be reduced.

The window area 14 can be moved within the range of the definition area 13. For example, perform a drag operation by moving, for example, a finger with the finger kept in contact with any desired position in the drawing area 11. This drag operation moves the position of the window area 14 within the definition area 13 in a direction opposite to a moving direction in which the finger is moved in the drag operation.

Figure 4:
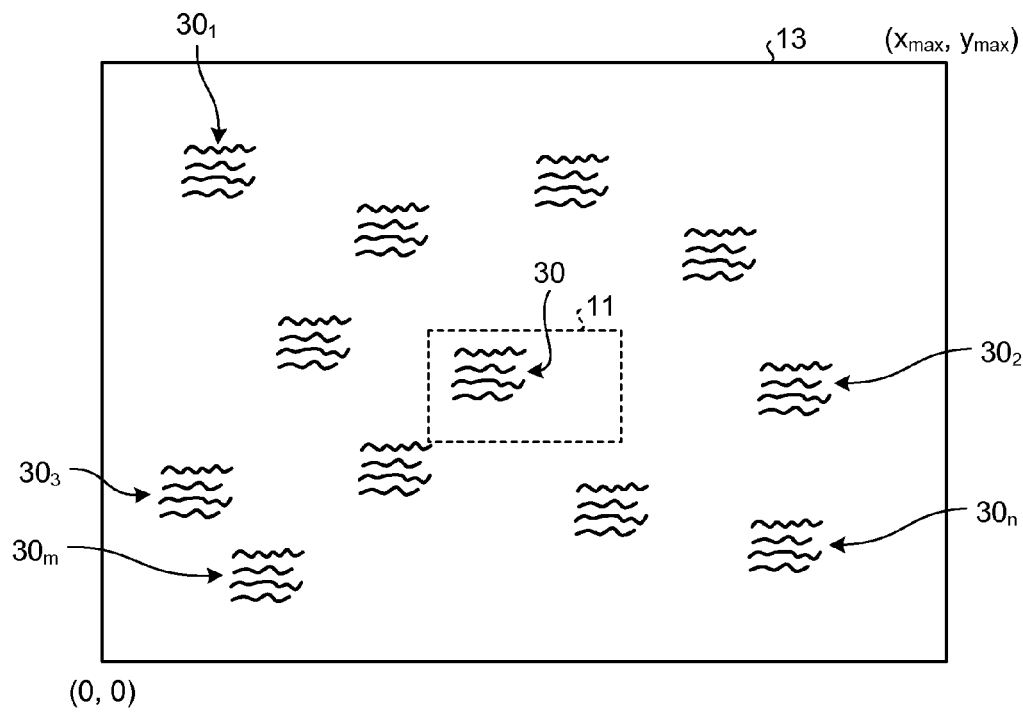
FIG. 4 is a diagram illustrating an example in which a plurality of objects are drawn in a definition area according to the first embodiment.

FIG. 4 illustrates an example in which a plurality of objects $30, 30_1, 30_2, 30_3, \ldots 30_m, \ldots 30_n$ are drawn in the definition area 13. In the example of FIG. 4, the object 30 is exclusively displayed in the drawing area 11 and the objects $30_1, 30_2, 30_3, \ldots 30_m, \ldots 30_n$ are additionally drawn in an area outside the drawing area 11 within the definition area 13. Performing the above-described drag operation with respect to the drawing area 11 causes the display in the drawing area 11 to be scrolled, so that the objects $30_1, 30_2, 30_3, \ldots 30_m, \ldots 30_n$ are displayed within the drawing area 11.

Figure 5:
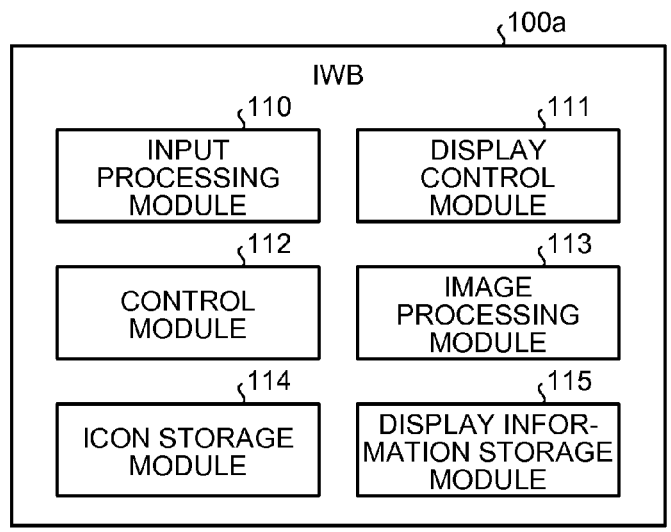
FIG. 5 is a functional block diagram illustrating exemplary functions of the IWB to be applicable to the first embodiment.

FIG. 5 is a functional block diagram illustrating exemplary functions of the IWB to be applicable to the first embodiment. In FIG. 5, the IWB 100a includes an input processing module 110, a display control module 111, a control module 112, an image processing module 113, an icon storage module 114, and a display information storage module 115.

The input processing module 110, the display control module 111, the control module 112, the image processing module 113, the icon storage module 114, and the display information storage module 115 are implemented by a computer program operating on a central processing unit (CPU). Alternatively, part or all of the input processing module 110, the display control module 111, the control module 112, the image processing module 113, the icon storage module 114, and the display information storage module 115 may be configured using different pieces of hardware that operate cooperatively with each other.

The input processing module 110 performs processing in response to a user operation performed on an input unit of the touch panel of the IWB 100a. For example, the input processing module 110 detects a position on the input unit that is touched by the user, detects whether a plurality of positions are touched simultaneously, and determines whether there is a change in contact positions over time (movement of the contact positions) and the direction of movement. The input processing module 110 also determines whether the user operates any of the icon images 20, 21, and 23, and stamps 22a to 22d.

The display control module 111 controls display on the display unit of the IWB 100a. For example, the display control module 111 controls setting of areas for the drawing area 11 and the toolbar 12 with respect to the display area 10 and controls display of each of the icon images 20, 21, and 23, and stamps 22a to 22d with respect to the toolbar 12 and the drawing area 11. The display control module 111 further generates a bitmap image on the basis of SVG data generated at the image processing module 113 to be described later and causes the drawing area 11 to display thereon the bitmap image. In addition, the display control module 111 further performs processing for converting the size of the image within the window area 14 described above to fit in the size of the drawing area 11.

The control module 112 controls entire operations of the IWB 100a. The image processing module 113 detects a drawing performed on the drawing area 11 on the basis of a result of the determination made by the input processing module 110 and generates SVG data according to the detected drawing. At this time, the image processing module 113 generates the SVG data by the drawing according to the coordinate system of the definition area 13.

The icon storage module 114 stores therein, in advance, the icon images 20, 21, and 23, and stamps 22a to 22d. The icon images 20, 21, and 23, and stamps 22a to 22d are stored in the icon storage module 114 as, for example, the SVG data.

The display information storage module 115 stores therein the SVG data generated as display information by the image processing module 113. The display information storage module 115 also stores therein the SVG data for each of the stamps 22a to 22d displayed as display information on the drawing area 11. The SVG data for each of the stamps 22a to 22d is stored according to the coordinate system in the definition area 13 as with the above-described SVG data by the drawing.

Figure 6:
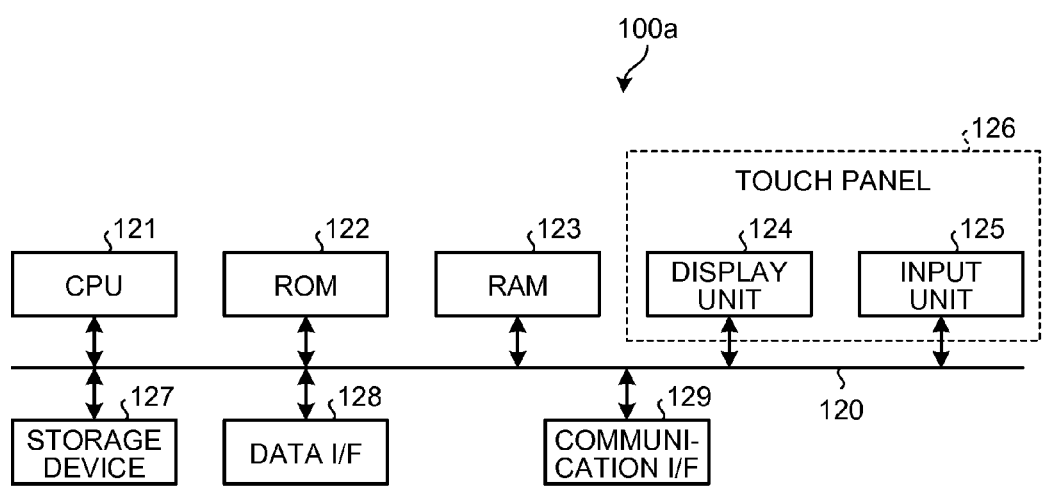
FIG. 6 is a block diagram illustrating an exemplary configuration of the IWB according to the first embodiment.

FIG. 6 illustrates an exemplary configuration of the IWB 100a according to the first embodiment. In FIG. 6, the IWB 100a includes a CPU 121, a read only memory (ROM) 122, a random access memory (RAM) 123, a display unit 124, an input unit 125, a storage device 127, a data I/F 128, and a communication I/F 129. These components of the IWB 100a are connected to each other through a bus 120 so as to be capable of communicating with each other. As such, the IWB 100a has a configuration similar to a configuration of general computers.

In the first embodiment, the data I/F 128 and the communication I/F 129 may be omitted. The storage device 127 may also be omitted by storing, for example, a computer program operating on the IWB 100a in the ROM 122 in advance.

In FIG. 6, the storage device 127 may be a nonvolatile semiconductor memory (flash memory) or a hard disk drive, in which an information processing program to be applicable to the first embodiment is stored in advance. The information processing program may be stored in the ROM 122 in advance. The CPU 121 controls operations of the IWB 100a relating to the first embodiment according to the program stored in advance in the ROM 122 or the storage device 127 and using the RAM 123 as a work memory.

The display information storage module 115 described above may store the display information in the RAM 123. The display information storage module 115 may store the display information in the storage device 127. In this case, the display information is stored in the storage device 127 in a nonvolatile manner and may be read from the storage device 127 for further use.

The display unit 124 includes, for example, an LCD as a display device and a drive circuit that drives the display device. The display unit 124 causes the display device to display an image according to a display control signal generated by the CPU 121 on the basis of a computer program. The input unit 125 includes a sensor associated with a display surface of the display unit 124 and outputs a control signal according to the position at which contact is detected. The display unit 124 and the input unit 125 are integrated with each other to form a touch panel 126.

The data I/F 128 controls data communications performed with an external device. A universal serial bus (USB) interface may, for example, be applied to the data I/F 128. The communication I/F 129 controls communications performed through a network.

The input processing module 110, the display control module 111, the control module 112, the image processing module 113, the icon storage module 114, and the display information storage module 115 described above are implemented by an information processing program operating on the CPU 121. The information processing program is provided by being in advance stored in the ROM 122 or the storage device 127. Alternatively, the information processing program may be configured so as to be stored in a computer connected to a network and be provided by being downloaded by the communication I/F 129 through the network. The information processing program may even be configured so as to be provided or distributed through the network.

Alternatively, the information processing program may be recorded and provided in a computer-readable recording medium such as a compact disc (CD) and a digital versatile disc (DVD) as an installable or executable file. In this case, the information processing program recorded in the recording medium is supplied to the IWB 100a through, for example, an external drive unit connected to the data I/F 128. Still alternatively, the information processing program recorded in the recording medium is temporarily stored in a personal computer or any other information processing apparatus and is supplied to the IWB 100a from other information processing apparatuses through communications performed through the communication I/F 129 or the data I/F 128.

The information processing program has a modular configuration including, for example, the above-described functional units (the input processing module 110, the display control module 111, the control module 112, the image processing module 113, the icon storage module 114, and the display information storage module 115). The CPU 121, as actual hardware, reads out the information processing program from, for example, the storage device 127 or the ROM 122 and executes the program, whereby each functional unit is loaded on a main storage (e.g., the RAM 123) and generated on the main storage.

Figure 7:
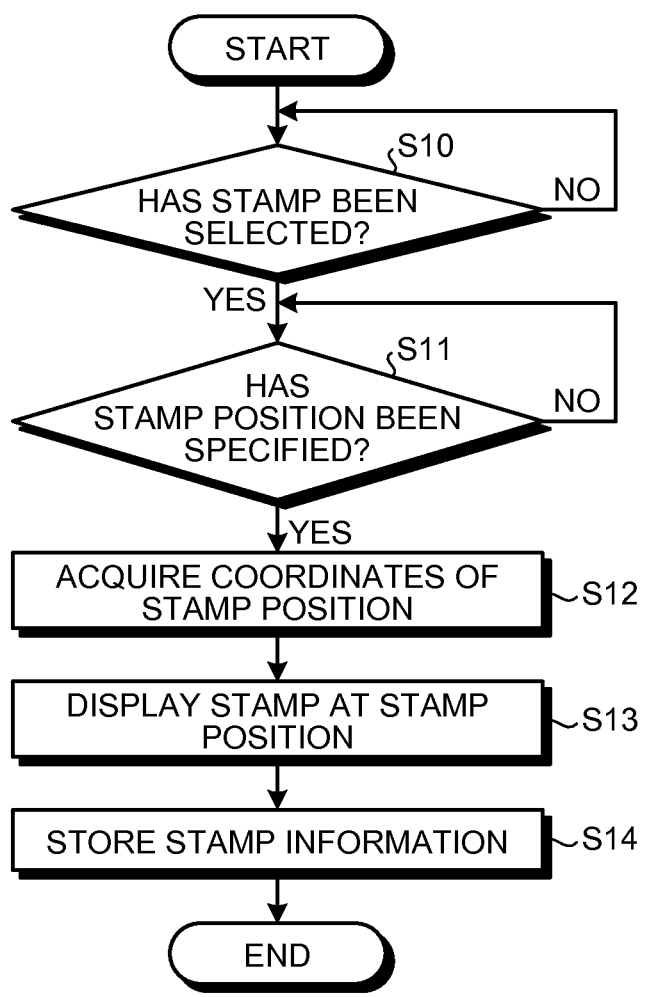
FIG. 7 is a flowchart illustrating an exemplary process of selecting a stamp and displaying the stamp at a desired position on a drawing area according to the first embodiment.

The following describes operations of the IWB 100a according to the first embodiment in detail with reference to FIGS. 7 to 10. FIG. 7 is a flowchart illustrating an exemplary process of selecting one stamp from among the stamps 22a to 22d and displaying the stamp at a desired position on the drawing area 11.

In FIG. 7, the IWB 100a determines at Step S10 whether any one of the stamps 22a to 22d displayed in the toolbar 12 has been selected. If the IWB 100a determines that contact has not been detected at any positions of the stamps 22a to 22d on the basis of a result of detection made by the input processing module 110 and none of the stamps 22a to 22d has been selected, the IWB 100a returns the process to perform Step S10.

If the IWB 100a determines that the user has tapped any one of the stamps 22a to 22d to thereby select a stamp, the IWB 100a advances the process to Step S11. Assume that the stamp 22a out of the stamps 22a to 22d has been selected. At Step S11, the IWB 100a determines whether the position at which the stamp 22a selected at Step S10 is displayed is specified.

Figure 8A:
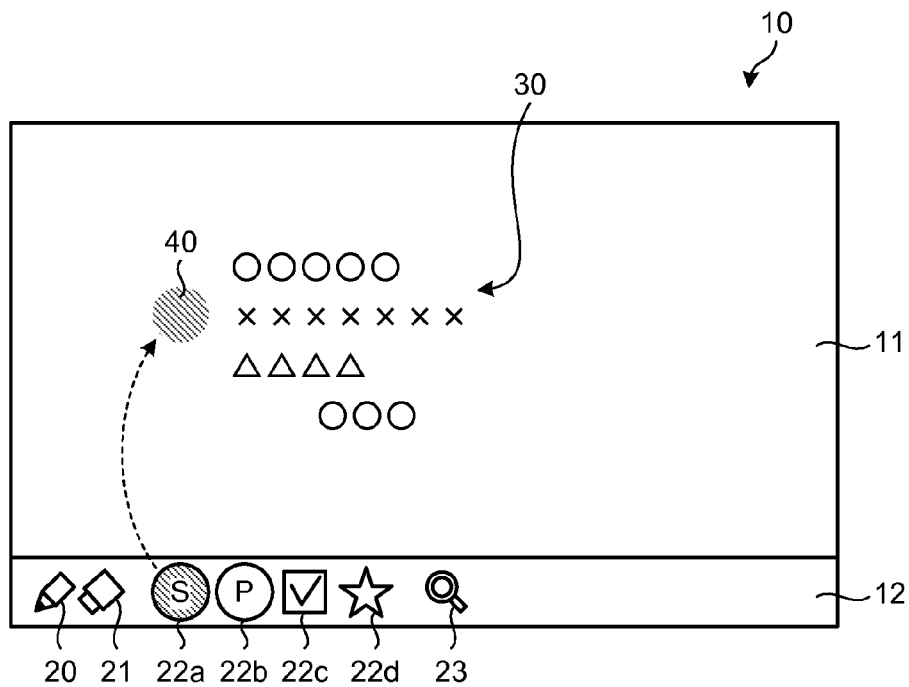
FIGS. 8A and 8B are diagrams illustrating how a stamp is selected, located, and displayed according to the first embodiment.

The following describes, with reference to FIG. 8A, how the stamp 22a is selected and the position at which the stamp 22a is displayed is specified. In FIG. 8A, the user taps to select the stamp 22a (Step S10). Next, the user next taps any position within the drawing area 11 as the position at which the selected stamp 22a is displayed. The example illustrated in FIG. 8A indicates that the user has tapped a position 40 that represents the starting position of the second line from the top of the object 30 that includes a character string comprising a plurality of lines.

At Step S12, the IWB 100a acquires coordinates of a display position of the stamp 22a specified at Step S11 on the basis of the result of detection made by the input processing module 110. For example, the IWB 100a acquires the coordinates on the drawing area 11 (display area 10) according to the result of detection made by the input processing module 110 and translates the acquired coordinates to coordinates on the definition area 13. At Step S13, the IWB 100a, according to the coordinates on the drawing area 11 acquired at Step S12, displays the stamp 22a through the control by the display control module 111.

Figure 8B:
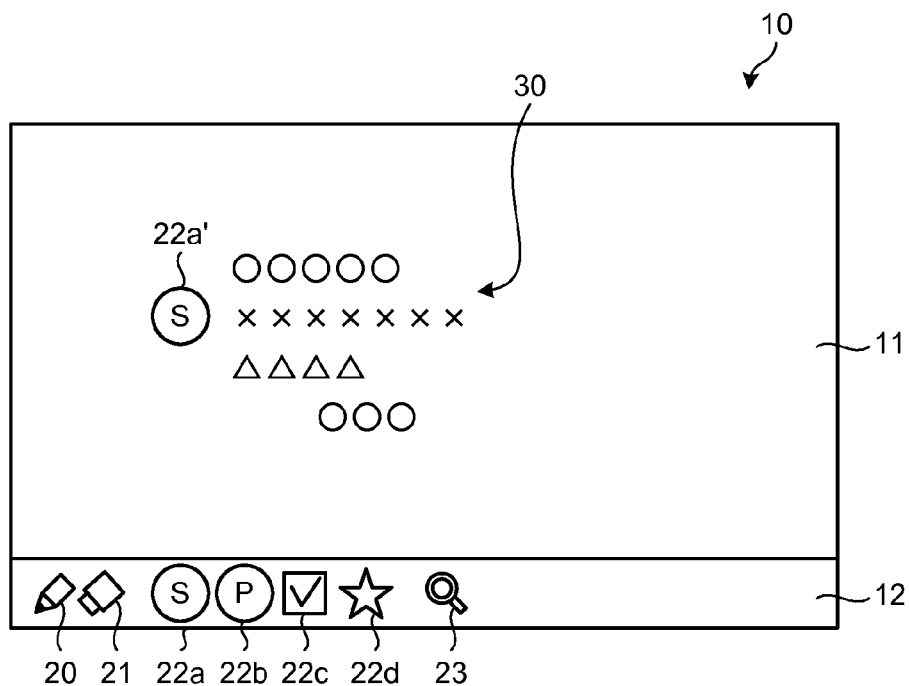

FIG. 8B illustrates an example in which a stamp 22a' is displayed at the position 40 specified in FIG. 8A. In the example of FIG. 8B, the stamp 22a' indicating "Settled" appears on the second line from the top of the object 30. This display can tell, for example, that the item on the corresponding line has been settled.

At Step S14, the IWB 100a adds, as stamp information, information of the stamp 22a' displayed on the drawing area 11 at Step S13 to a stamp list and stores the added information. The stamp list is recorded and stored in, for example, the display information storage module 115.

Figures 9, 10:
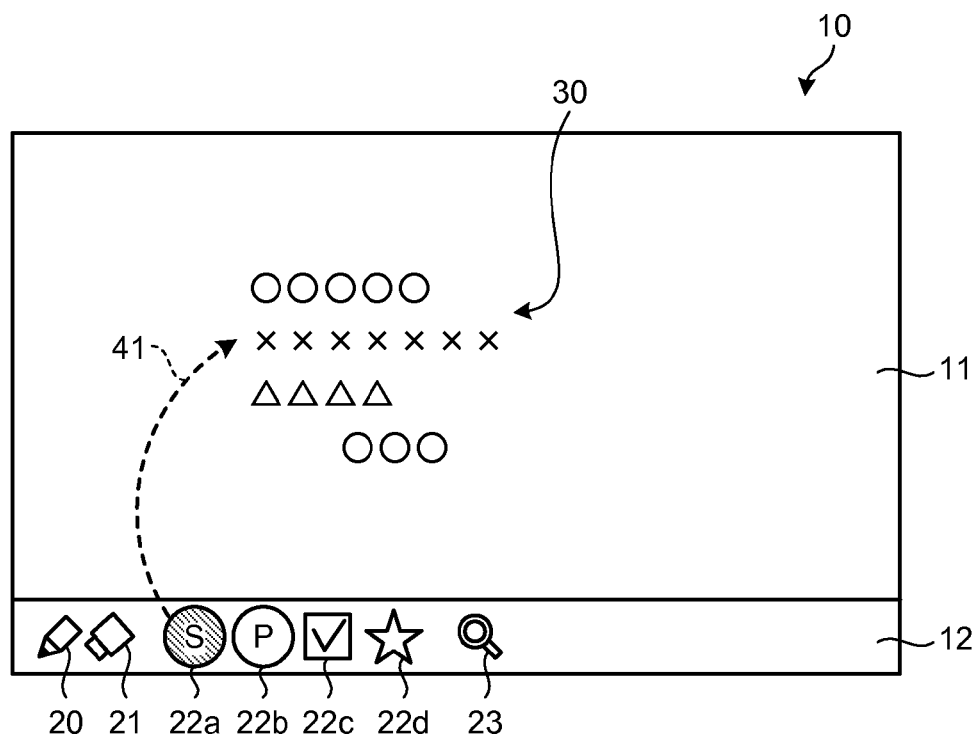
FIG. 9 is a diagram illustrating an exemplary stamp list according to the first embodiment.
FIG. 10 is an exemplary diagram illustrating how a stamp on a toolbar is moved through a drag-and-drop operation to a desired display position.

FIG. 9 illustrates an exemplary stamp list according to the first embodiment. As illustrated in FIG. 9, the stamp list includes the stamp information that associates information indicating types of the stamps 22a to 22d with coordinates in the definition area 13 indicating positions at which the stamps 22a to 22d are displayed.

In the above description, the desired stamp 22a is tapped and the position 40 at which the stamp 22a is displayed is next tapped, whereby the stamp 22a is displayed at the position 40. This is, however, not limited to the present embodiment. For example, as indicated by a path 41 in FIG. 10, the stamp 22a on the toolbar 12 may be moved to a desired position through a drag-and-drop operation, so as to set the display position of the stamp 22a. It is noted that the stamp 22a in the toolbar 12 stays at the former position in the tool bar 12 after the drag-and-drop operation.

Stamp Map According to the First Embodiment

The first embodiment enables generation of a stamp map that is assumed as an image being displayed within a single display area displaying all stamp positions specified within the definition area 13. The stamp map displays a plurality of objects $30_0$ to $30_n$ within the definition area 13. Even when a stamp is displayed for each of the objects $30_0$ to $30_n$ as appropriate, the stamp map allows a desired piece of information to be quickly identified.

The following describes, with reference to FIGS. 11 to 14, a method for displaying the stamp map according to the first embodiment. Assume that a plurality of objects 30, $30_1$, $30_2$, $30_3$, ... $30_m$, ... $30_n$ are drawn at their respective arbitrary positions on the definition area 13, as exemplarily illustrated in FIG. 11. Further assume that a position of the stamp 22a' is specified near the object 30, a position of a stamp 22c' is specified near the object $30_1$, a position of a stamp 22d' is specified near the object $30_2$, another position of the stamp 22a' is specified near the object $30_3$, and a position of a stamp 22b' is specified near the object $30_m$.

Figure 11:
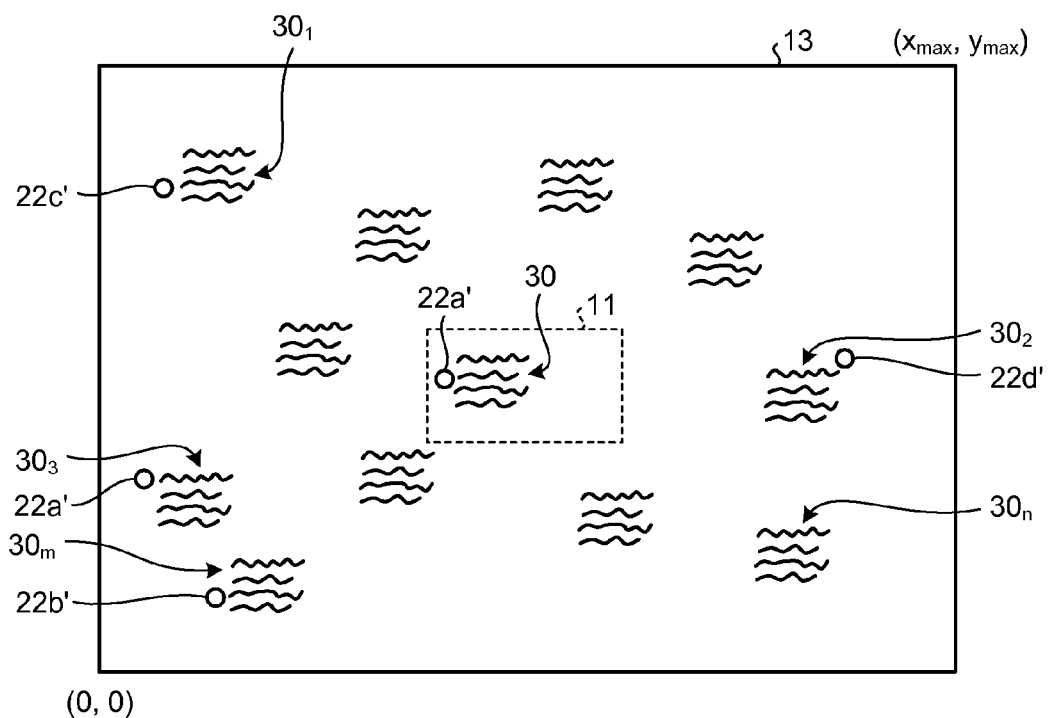
FIG. 11 is an exemplary diagram illustrating a plurality of objects drawn at their respective arbitrary positions on the definition area.

In FIG. 11, the area enclosed by the dotted line is displayed within the drawing area 11 as in FIG. 8B. In such a case, when the image in the definition area 13 to be displayed within the drawing area 11 is reduced such that the stamps 22a' to 22d' can be all included within the drawing area 11, it is expected that the user can easily determine which object should be noted.

Consider a case in which the stamps 22a' to 22d' are widely distributed over the definition area 13. In this case, the image within the definition area 13 is reduced with a markedly low display magnification, resulting in each of the stamps 22a' to 22d' being reduced to a size that is too small to visually determine the type of the stamp.

When the image within the definition area 13 is reduced at a low display magnification, the first embodiment forms a stamp map in which each of the stamps 22a' to 22d' is replaced with another image, whereby information indicated by the stamps 22a' to 22d' can be easily visually determined.

Figure 12:
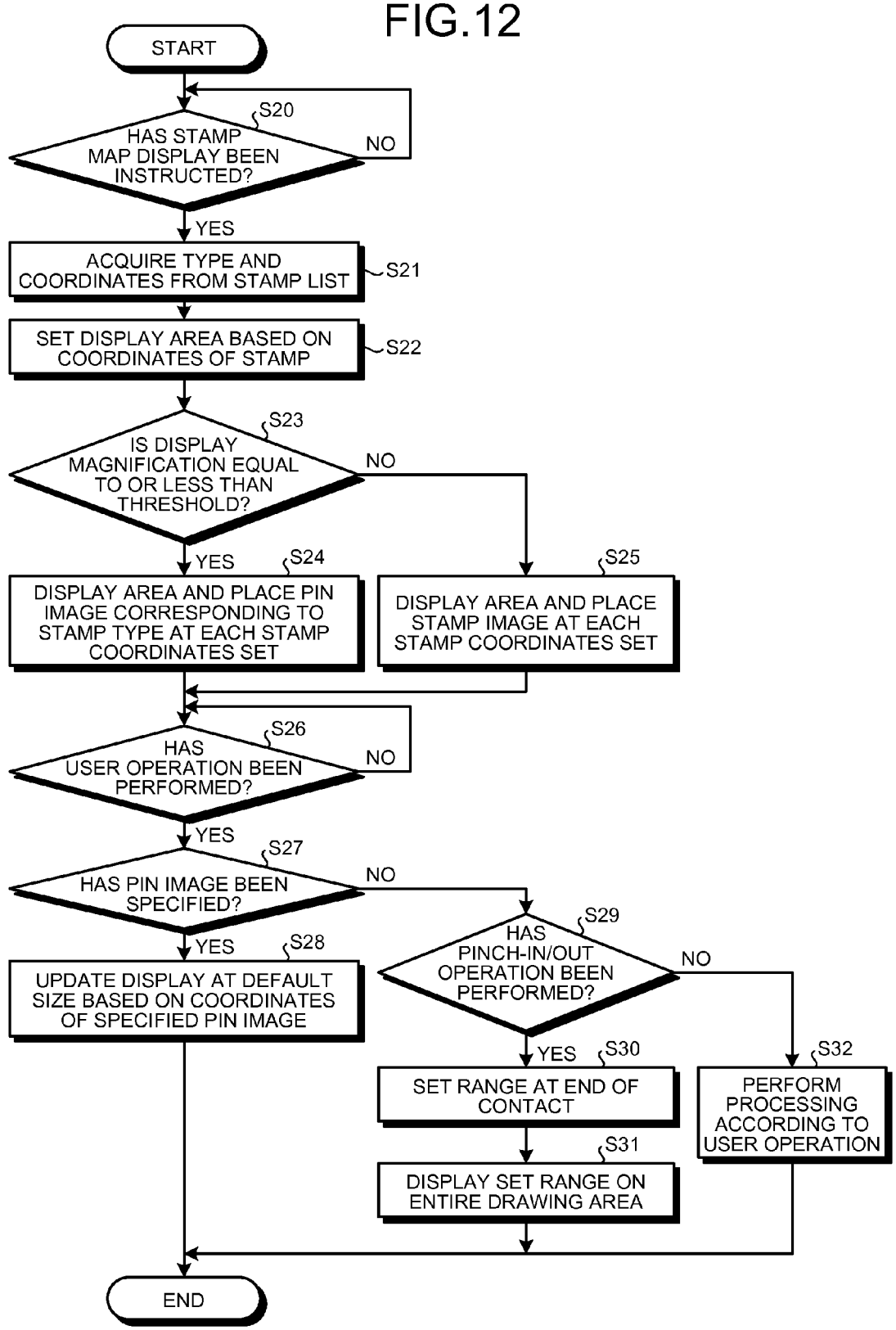
FIG. 12 is a flowchart illustrating an exemplary process for displaying a stamp map according to the first embodiment.

FIG. 12 is a flowchart illustrating an exemplary process for displaying a stamp map according to the first embodiment. At Step S20, the IWB 100a determines whether a stamp map display has been instructed. Reference is also made to FIG. 8B. The IWB 100a determines, on the basis of a result of detection made by the input processing module 110, whether the icon image 23 that is displayed on the toolbar 12 and that instructs a stamp map display has been specified. If the IWB 100a determines that the stamp map display has not been instructed, the IWB 100a returns the process to perform Step S20. If the IWB 100a determines that the icon image 23 has been specified at Step S20, the IWB 100a advances the process to Step S21.

At Step S21, the IWB 100a acquires stamp information from the stamp list and further acquires the stamp type and the coordinates. At Step S22, the IWB 100a sets, within the definition area 13, a display area for display on the drawing area 11 on the basis of the coordinates of each stamp included in the stamp information acquired at Step S21.

The process performed at Step S22 will be described below with reference to FIG. 13. For example, the display control module 111 in the IWB 100a obtains a maximum value and a minimum value of x-coordinate and y-coordinate, respectively, on the basis of the coordinates included in the stamp list stored in the display information storage module 115. According to the maximum value and the minimum value obtained of x-coordinate and y-coordinate, the display control module 111 sets the window area 14 within the definition area 13.

Figure 13:
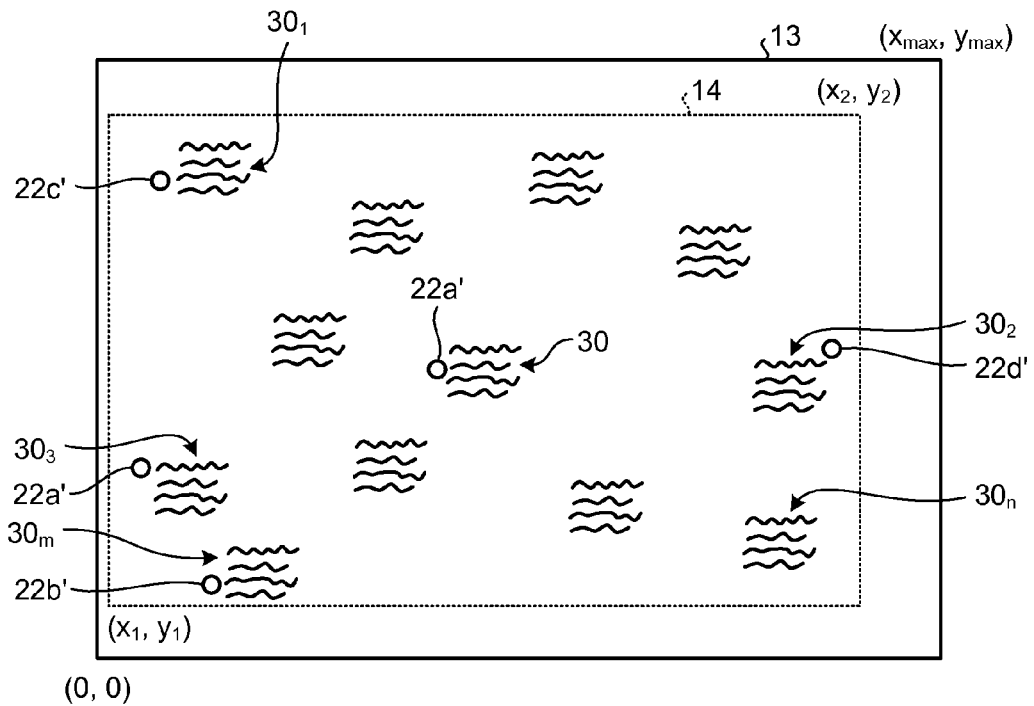
FIG. 13 is a diagram for illustrating a process for determining a display area on the basis of coordinates of the stamps according to the first embodiment.

In the example of FIG. 13, the window area 14 is defined by the coordinates $(x_1, y_1)$ at the lower left corner and the coordinates $(x_2, y_2)$ at the upper right corner in accordance with the maximum value $x_2$ and the minimum value $x_1$ of the x-coordinate and the maximum value $y_2$ and the minimum value $y_1$ of the y-coordinate. More specifically, in the example of FIG. 13, the minimum value $x_1$ of the x-coordinate is determined by the position of the stamp 22a' specified near the object $30_3$ and the maximum value $x_2$ of the x-coordinate is determined by the position of the stamp 22d' specified near the object $30_2$. The minimum value $y_1$ of the y-coordinate is determined by the position of the stamp 22b' specified near the object $30_m$ and the maximum value $y_2$ of the y-coordinate is determined by the position of the stamp 22c' specified near the object $30_1$.

In practice, the window area 14 incorporates margins that correspond to pin images to be described later with respect to the maximum value $x_2$ and the minimum value $x_1$ of the x-coordinate and the maximum value $y_2$ and the minimum value $y_1$ of the y-coordinate.

Having set the window area 14, the display control module 111 obtains, at Step S23, the display magnification that indicates a degree of reduction of the image in the window area 14 when the image in the window area 14 is to be displayed fitting the size of the drawing area 11. The display control module 111 then determines whether the obtained display magnification is equal to or less than a threshold.

If the display control module 111 determines at Step S23 that the display magnification of the window area 14 is equal to or less than the threshold, the display control module 111 advances the process to Step S24. At Step S24, the display control module 111 reduces the image in the window area 14 at the display magnification obtained at Step S23 and displays, at the coordinates of each stamp, a pin image corresponding to the type of the stamp displayed at the coordinates.

Figure 14:
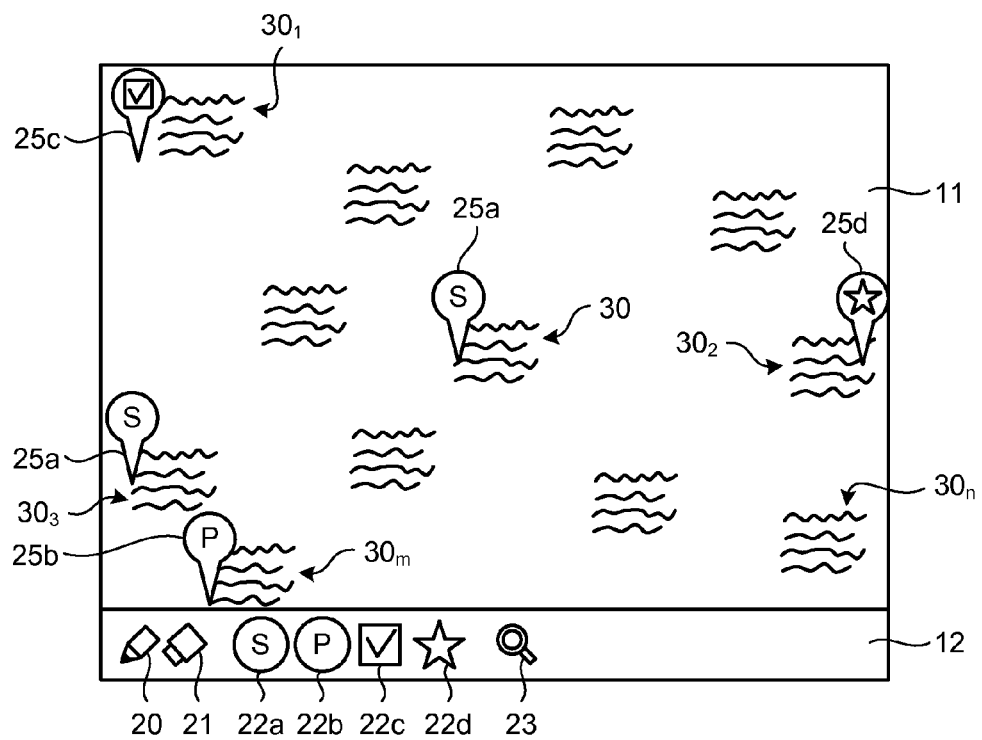
FIG. 14 is a diagram for illustrating display of pin images at the coordinates of the stamps according to the first embodiment.

The following describes, with reference to FIG. 14, the display of the pin image at the coordinates of each stamp. As described above, the display control module 111 cuts out the image of the window area 14 from the image of the definition area 13 and subjects the cut-out image to a reduction process at the display magnification obtained at Step S23. In addition, the display control module 111 replaces the stamps 22a' to 22d' at their respective coordinates in the image in the window area 14 reduced at the display magnification with respective pin images 25a to 25d that correspond to the types of the stamps 22a' to 22d'.

The pin images 25a to 25d each indicate the specified coordinates. In the example of FIG. 14, the pin images 25a to 25d each comprise a disk-shaped label portion and an acute-angled triangular pin portion and represent a designed map pin. The shape of the pin images 25a to 25d is not limited to what has been described above. In some embodiments, the pin image may be otherwise shaped to indicate the coordinates and the corresponding stamp type in a readily recognizable manner.

In each of the pin images 25a to 25d, the label portion indicates the corresponding stamp type. For example, the pin image 25a that corresponds to the stamp 22a indicating "Settled" includes the character "S" at its label portion. Alternatively, the pin image 25c that corresponds to the stamp 22c indicating "Check item" includes a check box at its label portion. The pin images 25a to 25d are displayed in the image in the window area 14 such that each of the acute-angled triangular pin portions has a leading end aligned with the coordinates of the corresponding stamp.

In each of the pin images 25a to 25d, the portion indicating the corresponding stamp type is clearly separated from the portion indicating the coordinates of the stamp, as described above. Use of the pin images 25a to 25d thus permits the following. Specifically, when coordinates of a plurality of stamps are densely displayed in an image in the window area 14 reduced at a display magnification equal to or lower than the threshold, the coordinates of each stamp and the meaning specified for the coordinates of each stamp are more easily recognizable than when the stamps 22a to 22d are directly displayed.

If the display control module 111 determines at Step S23 that the display magnification of the window area 14 exceeds the threshold, the display control module 111 advances the process to Step S25. At Step S25, the display control module 111 reduces the image in the window area 14 at the display magnification obtained at Step S23. In this case, the stamps 22a to 22d reduced at the display magnification in question are displayed at the coordinates of the respective stamps. The stamps 22a to 22d at their original sizes may nonetheless be displayed at the coordinates of the respective stamps.

As such, if the display magnification for the image in the window area 14 exceeds the threshold, the stamps 22a to 22d are each displayed at the coordinates of each stamp as a reduced image at the display magnification in question. Preferably, therefore, the threshold is set to a minimum value at which the meaning of each of the stamps 22a to 22d is discernible when each of the stamps 22a to 22d is reduced at the corresponding display magnification.

Upon completing Step S24 or Step S25, the display control module 111 advances the process to Step S26. The display control module 111 determines whether a user operation has been performed on the IWB 100a. If the display control module 111 determines, on the basis of the result of detection made by the input processing module 110, that a user operation has not been performed on the IWB 100a, the display control module 111 returns the process to Step S26. Alternatively, if the display control module 111 determines, on the basis of the result of detection made by the input processing module 110, that a user operation has been performed on the IWB 100a, the display control module 111 advances the process to Step S27.

At Step S27, the display control module 111 determines whether the user operation detected at Step S26 is to specify any one of the pin images 25a to 25d displayed on the drawing area 11. If the display control module 111 determines that the user operation to specify any one of the pin images 25a to 25d has been performed, the display control module 111 advances the process to Step S28. For example, if the display control module 111 determines, on the basis of the result of detection made by the input processing module 110, that any one of the pin images 25a to 25d has been tapped by the user operation, the display control module 111 advances the process to Step S28.

At Step S28, the display control module 111 updates the display of the drawing area 11 at, for example, a default size on the basis of the coordinates indicated by a specific one of the pin images 25a to 25d specified by the user operation (e.g., the pin image 25a associated with the object 30).

Figure 15:
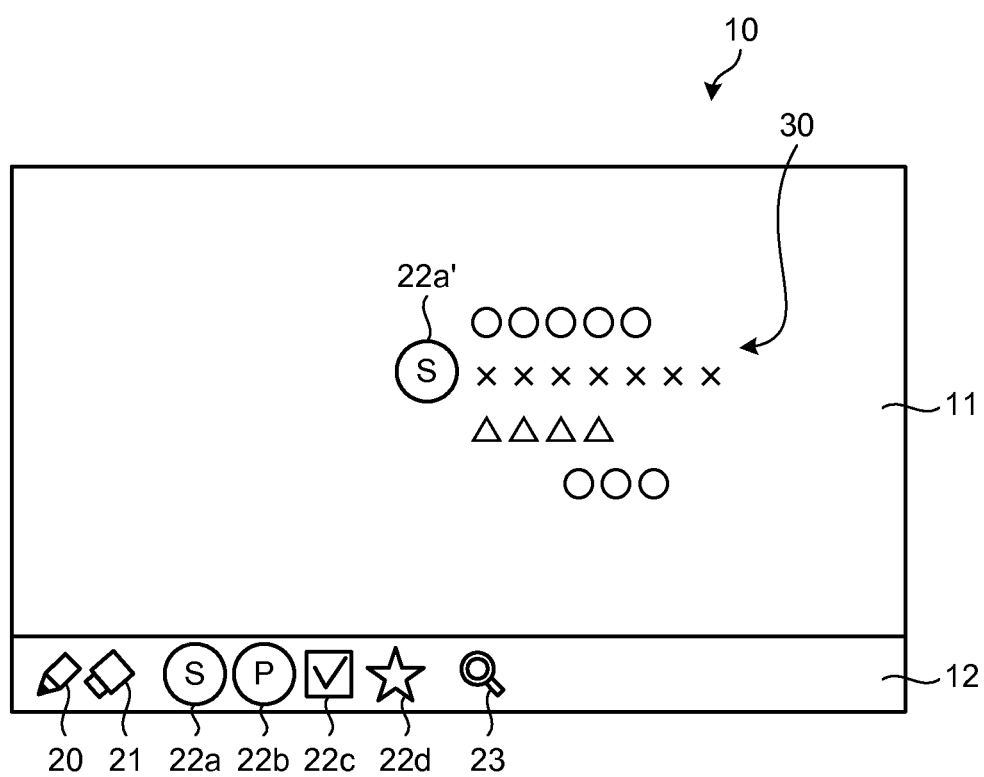
FIG. 15 is a diagram for illustrating display according to the first embodiment when a pin image is specified.

The following describes, with reference to FIG. 15, display when the pin image is specified. When the pin image 25a is specified, the size of the window area 14 is set to a default with the coordinates of the specified pin image 25a at the center. In this specification, the default size of the window area 14 is assumed to be identical to the size of the drawing area 11. In this case, the display magnification is 1 when the image of the window area 14 is displayed on the drawing area 11.

The stamp 22a' corresponding to the pin image 25a is displayed at the coordinates of the pin image 25a in the window area 14. This operation updates the display of the drawing area 11 to a condition in which, as exemplarily illustrated in FIG. 15, the stamp 22a' is displayed at the center of the drawing area 11 and the object 30 is displayed corresponding to the position of the stamp 22a'. This update enables the user to easily determine the type of the stamp 22a' associated with the specified pin image 25a and details of the object 30 associated with the stamp 22a'.

The updating of the display of the drawing area 11 at Step S28 terminates the process according to the flowchart of FIG. 12.

If the display control module 111 determines, at Step S27, that the user operation detected at Step S26 is not to specify any one of the pin images 25a to 25d displayed on the drawing area 11, the display control module 111 advances the process to Step S29. At Step S29, the display control module 111 determines whether the user operation detected at Step S26 is a pinch-in/out operation.

The pinch-in/out operation refers to, with two fingers kept placed on simultaneously, for example, the touch panel 126, spreading apart the fingers (pinch-out) or bringing together the fingers (pinch-in) while two fingers keep contact with the touch panel 126. Bringing the fingers away to be detached from the touch panel 126 allows the input processing module 110 to detect that the pinch-in/out operation is terminated. The pinch-in/out operation is suitable for setting a range on the touch panel 126, for example.

If the display control module 111 determines, on the basis of the result of detection made by the input processing module 110, that the user operation performed on the IWB 100a is the pinch-in/out operation, the display control module 111 advances the process to Step S30. At Step S30, the display control module 111 acquires coordinates at the two locations reached by the fingers as a result of the termination of the contact by the pinch-in/out operation and sets a range defined by the coordinates at these two locations.

At Step S31 that follows, the display control module 111 applies the range set at Step S30 to an entire range of the drawing area 11. Specifically, the display control module 111 applies the range set at Step S30 to the window area 14 and obtains a display magnification at which the image in the window area 14 is to be displayed in the drawing area 11 at a correct size. The display magnification at this time can even be 1 or more, that is, enlargement is possible. The display control module 111 enlarges or reduces the image in the window area 14 according to the obtained display magnification, thereby displaying the enlarged or reduced image in the drawing area 11.

When the image of the window area 14 is displayed on the drawing area 11 at Step S31, the process of the flowchart illustrated in FIG. 12 is terminated.

If the display control module 111 determines at Step S29 that the user operation detected at Step S26 is not the pinch-in/out operation, the display control module 111 advances the process to Step S32. At Step S32, the display control module 111 performs processing according to the user operation detected at Step S26 and the process by the flowchart illustrated in FIG. 12 is terminated.

As described above, in the first embodiment, the stamps 22a' to 22d' can be displayed for the object 30 drawn on the drawing area 11. Furthermore, in the first embodiment, each of the stamps 22a' to 22d' can be replaced with a corresponding one of the pin images 25a to 25d when the image in the definition area 13 is fit and displayed in the drawing area 11. This arrangement allows a target object to be easily identified from among objects drawn in the definition area 13, thus enhancing convenience of the IWB 100a.

Second Embodiment

A second embodiment will be described below. In a conference using whiteboards that are not electronized, participants attending the conference affix tags handwritten thereby to the whiteboards to advance the proceedings. The second embodiment includes an IWB and a user terminal device that together achieve the function of the tag.

Figure 16:
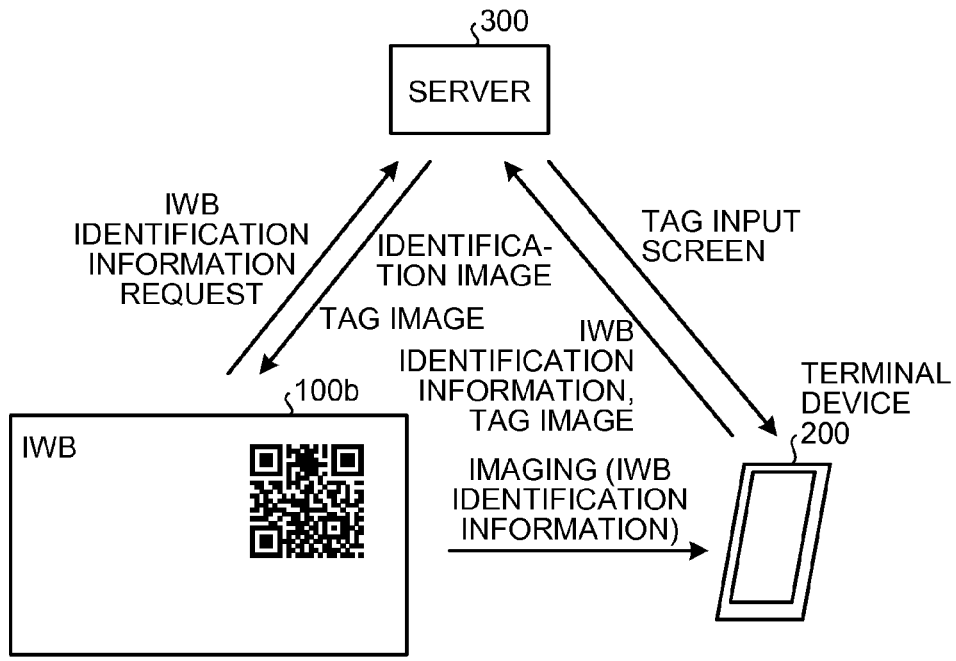
FIG. 16 is a block diagram illustrating an exemplary configuration of an information sharing system according to a second embodiment of the present invention.

FIG. 16 is a diagram illustrating an exemplary configuration of an information sharing system according to a second embodiment. In FIG. 16, the information sharing system includes an IWB 100b, a terminal device 200, and a server 300 connected to the IWB 100b and the terminal device 200 through a network such as the Internet.

The IWB 100b to be described in detail later represents the IWB 100a to which a network communication function is added. A browser application (hereinafter abbreviated to a browser) for viewing information in the network is installed in the IWB 100b. The browser can operate according to a computer program acquired from the network. The function of the IWB 100b as an electronic blackboard can be implemented by a computer program acquired by the browser.

The terminal device 200 is a portable information processing device having a function of connecting to the network. For example a smartphone (a multifunctional portable telephone terminal) may be used for the terminal device 200. The terminal device 200 has a relatively compact touch panel having an effective display area of, for example, several inches to ten or so inches in diagonal size. The terminal device 200 also has an image capturing function, capable of imaging an object and capturing the object as an image. A browser is also installed in the terminal device 200.

The server 300 is an information processing system configured on a network cloud. The network cloud includes a plurality of computers connected to each other through a network. The network cloud is a network group that reveals only inputs and outputs and conceals their contents from the outside as a black box. The server 300 as an information processing system is configured by at least one computer in the network cloud. Understandably, the server 300 may even be configured with, for example, a single computer, not on the network cloud.

When the browser of the IWB 100b is started in such an information sharing system, the browser communicates with the server 300 through the network and requests a computer program that enables the IWB 100b to perform an operation according to the second embodiment (hereinafter referred to as an IWB program) from the server 300. Upon receipt of the IWB program from the server 300, the browser starts thereon the received information processing program. The IWB program is described using a program language that is executable on the browser, such as HyperText Markup Language (HTML) and JAVA (a registered trademark).

The browser communicates with the server 300 according to the IWB program to thereby acquire from the server 300 IWB identification information for identifying the IWB 100b and an identification image that includes the IWB identification information and a location (uniform resource locator: URL) of the server 300 on the network. The browser causes the IWB 100b to display the identification image. In the example of FIG. 16, a QR code (a registered trademark) as one of two-dimensional codes is used as the identification image.

The user captures the identification image displayed on the IWB 100b using the terminal device 200 and decodes the captured image to thereby acquire the IWB identification information and the URL of the server 300. The terminal device 200 communicates with the server 300 using the acquired URL of the server 300 and acquires a computer program that enables the terminal device 200 to perform the operation according to the second embodiment (hereinafter referred to as a tag program). This tag program runs on the browser installed in the terminal device 200 and is described using a program language that is executable on the browser, such as HTML and JAVA (a registered trademark). The user operates the terminal device 200 and, using the browser on which the tag program runs, inputs tag information, and transmits to the server 300 the input tag information with the IWB identification information appended.

The server 300 transmits the tag information transmitted from the terminal device 200 to the IWB 100b according to the IWB identification information. The IWB 100b displays a tag image based on the tag information transmitted from the server 300. As such, the second embodiment allows the tag image based on the tag information input from each terminal device 200 held by each user to be displayed on the IWB 100b, thus enhancing convenience of the IWB 100b.

Figure 17:
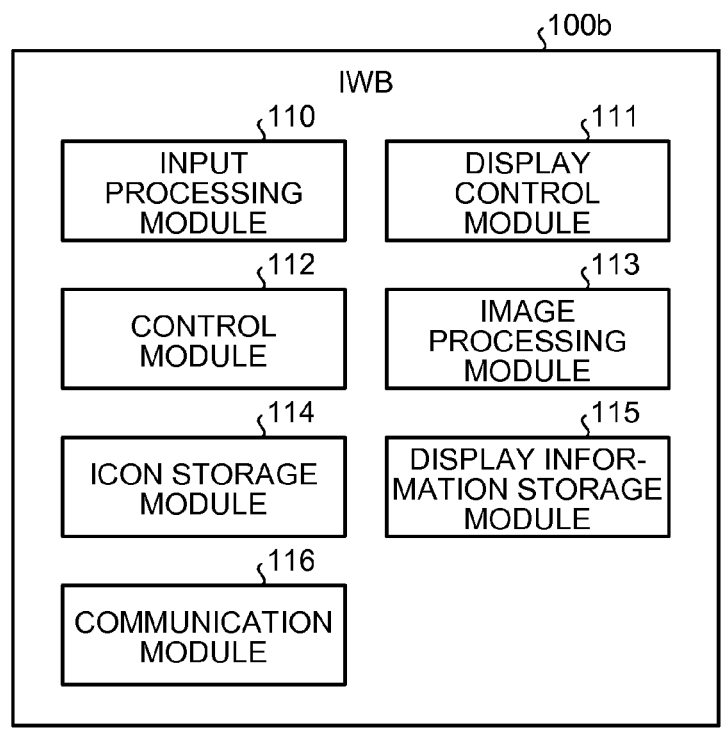
FIG. 17 is a functional block diagram for illustrating functions of an IWB according to the second embodiment.

FIG. 17 is a functional block diagram for illustrating functions of the IWB 100b according to the second embodiment. In FIG. 17, similar parts are identified by the same reference numerals as those used in FIG. 5 and detailed descriptions therefor will be omitted. In FIG. 17, the IWB 100b according to the second embodiment is same as the IWB 100a according to the first embodiment described with reference to FIG. 5 to which a communication module 116 for performing communications with the server 300 is added.

The IWB 100b is configured in exactly the same manner as the IWB 100a according to the first embodiment described with reference to FIG. 6 and descriptions therefor will here be omitted.

Part or all of an input processing module 110, a display control module 111, a control module 112, an image processing module 113, an icon storage module 114, a display information storage module 115, and the communication module 116 illustrated in FIG. 17 are implemented by the IWB program operating on a CPU 121. For example, at least the display control module 111 and the communication module 116 are implemented by the IWB program. In the second embodiment, the IWB 100b acquires the IWB program from the server 300 each time it performs the operation according to the second embodiment. The acquired IWB program is stored in, for example, a storage device 127 or a RAM 123 and, when the operation according to the second embodiment is completed, erased therefrom.

Alternatively, the IWB program may be provided by being recorded in a computer-readable recording medium, such as a CD and a DVD. The IWB program may even be provided through a network and installed in the IWB 100b.

Figure 18:
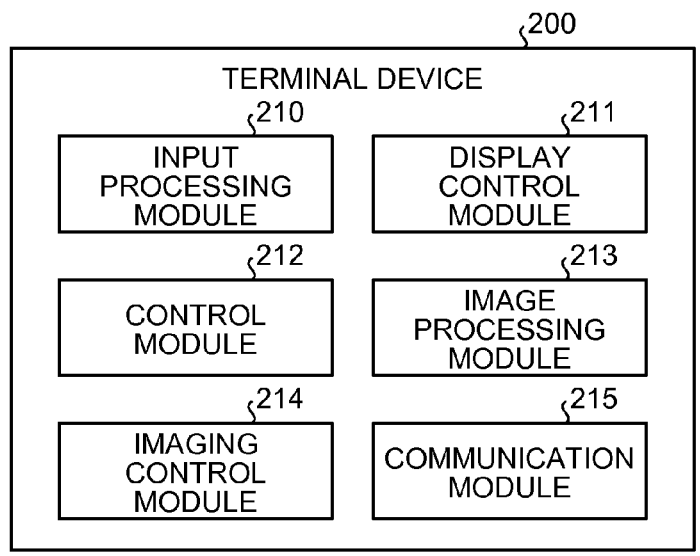
FIG. 18 is a functional block diagram for illustrating functions of a terminal device that can be applied to the second embodiment.

FIG. 18 is a functional block diagram for illustrating functions of the terminal device 200 that can be applied to the second embodiment. The terminal device 200 includes an input processing module 210, a display control module 211, a control module 212, an image processing module 213, an imaging control module 214, and a communication module 215.

The input processing module 210, the display control module 211, the control module 212, the image processing module 213, the imaging control module 214, and the communication module 215 are implemented by a computer program operating on the CPU. Alternatively, part or all of the input processing module 210, the display control module 211, the control module 212, the image processing module 213, the imaging control module 214, and the communication module 215 may be configured using different pieces of hardware that operate cooperatively with each other.

The input processing module 210 performs processing in response to a user operation performed on an input unit of the touch panel of the terminal device 200. The display control module 211 controls display on a display unit of the terminal device 200. The control module 212 controls entire operations of the terminal device 200. The image processing module 213 detects a drawing on the basis of a result of determination made by the input processing module 210 and generates SVG data according to the detected drawing.

The imaging control module 214 controls driving of an image pickup device such as a charge coupled device (CCD). The imaging control module 214 acquires a captured image from the image pickup device, performs predetermined processing including white balance adjustment and gamma correction for the captured image, and outputs a result as image data. The communication module 215 controls communications carried out through the network. The control module 212 controls entire operations of the terminal device 200.

Figure 19:
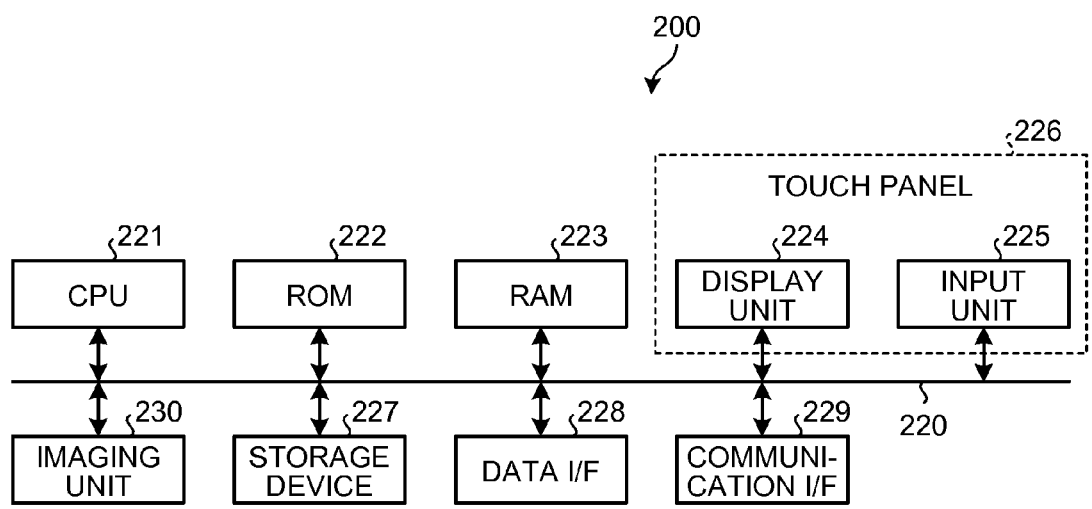
FIG. 19 is a block diagram illustrating an exemplary configuration of the terminal device according to the second embodiment.

FIG. 19 illustrates an exemplary configuration of the terminal device 200 according to the second embodiment. In FIG. 19, the terminal device 200 includes a CPU 221, a ROM 222, a RAM 223, a display unit 224, an input unit 225, a storage device 227, a data I/F 228, and a communication I/F 229. These components of the terminal device 200 are connected to each other through a bus 220 so as to be capable of communicating with each other. As such, the terminal device 200 has a configuration similar to a configuration of general computers.

In FIG. 19, the storage device 227 may be a nonvolatile semiconductor memory (flash memory) or a hard disk drive. The CPU 221 controls general operations of the terminal device 200 according to the program stored in the ROM 222 or the storage device 227 and using the RAM 223 as a work memory.

The display unit 224 includes, for example, an LCD as a display device and a driver circuit that drives the display device, and displays on the display device an image according to a display control signal generated by the CPU 221 on the basis of the program. The input unit 225 includes a sensor associated with a display surface of the display unit 224 and outputs a control signal according to the position at which contact is detected. The display unit 224 and the input unit 225 are integrated with each other to form a touch panel 226.

The data I/F 228 controls data communications performed with an external device. A USB interface may be applied to the data I/F 228, for example. Bluetooth (a registered trademark) may be applied to as the data I/F. The communication I/F 229 controls wireless communications performed through a network.

Part or all of the input processing module 210, the display control module 211, the control module 212, the image processing module 213, the imaging control module 214, and the communication module 215 illustrated in FIG. 18 are implemented by the tag program operating on the CPU 221. For example, at least the input processing module 210 and the communication module 215 are implemented by the tag program. In the second embodiment, the terminal device 200 acquires the tag program from the server 300 each time it performs the operation according to the second embodiment. The acquired tag program is stored in, for example, the storage device 227 or the RAM 223 and, when the operation according to the second embodiment is completed, erased therefrom.

Alternatively, the tag program may be provided by being recorded in a computer-readable recording medium, such as a CD and a DVD. The tag program may even be provided through a network and installed in the terminal device 200.

The tag program has a modular configuration including, for example, the above-described functional units (the input processing module 210, the display control module 211, the control module 212, the image processing module 213, the communication module 215). The CPU 221, as actual hardware, reads out the tag program from, for example, the storage device 227 or the RAM 223 and executes the program, whereby each functional unit is loaded on a main storage (e.g., the RAM 223) and generated on the main storage.

Figure 20:
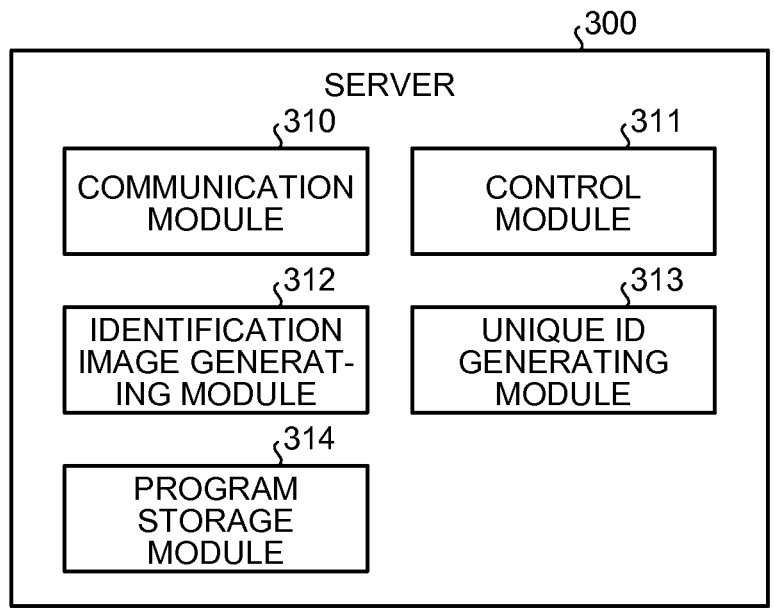
FIG. 20 is a functional block diagram for illustrating functions of a server according to the second embodiment.

FIG. 20 is a functional block diagram for illustrating functions of the server 300 according to the second embodiment. In FIG. 20, the server 300 includes a communication module 310, a control module 311, an identification image generating module 312, a unique ID generating module 313, and a program storage module 314. The communication module 310, the control module 311, the identification image generating module 312, the unique ID generating module 313, and the program storage module 314 are implemented by a computer program operating on the CPU. Alternatively, part or all of the communication module 310, the control module 311, the identification image generating module 312, the unique ID generating module 313, and the program storage module 314 may be configured using different pieces of hardware that operate cooperatively with each other.

The communication module 310 controls communications performed through the network. The control module 311 controls entire operations of the server 300. The identification image generating module 312 generates an identification image that represents a URL of the server 300 and input identification information encoded. The unique ID generating module 313 generates identification information upon request. The program storage module 314 stores therein the IWB program to be transmitted to the IWB 100b and the tag program to be transmitted to the terminal device 200.

Figure 21:
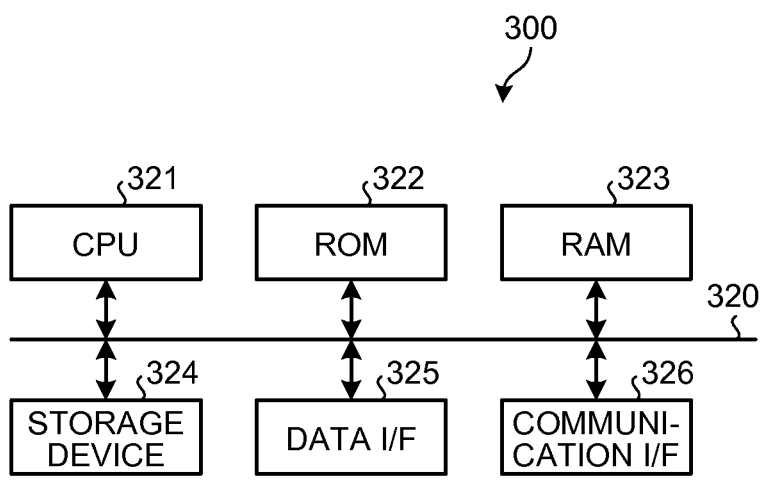
FIG. 21 is a block diagram illustrating an exemplary configuration of the server according to the second embodiment.

FIG. 21 is a block diagram illustrating an exemplary configuration of the server 300 according to the second embodiment. In FIG. 21, the server 300 includes a CPU 321, a ROM 322, a RAM 323, a storage device 324, a data I/F 325, and a communication I/F 326. These components of the server 300 are connected to each other through a bus 320 so as to be capable of communicating with each other. As such, the server 300 has a configuration similar to a configuration of general computers.

In FIG. 21, for example, the storage device 324 may be a hard disk drive and stores therein in advance an information processing program according to the second embodiment. In addition, the storage device 324 stores therein in advance a display control program to be transmitted to the IWB 100b and the tag program to be transmitted to the terminal device 200. The display control program and the tag program pertain to the second embodiment.

The CPU 321 controls the operation of the server 300 according to the second embodiment according to the information processing program stored in advance in the ROM 322 or the storage device 324 and using the RAM 323 as a work memory. The data I/F 325 controls data communications performed with an external device. A USB interface may be applied to the data I/F 325, for example. The data I/F 325 may be omitted in the configuration of the server 300 according to the second embodiment. The communication I/F 326 controls communications performed through the network.

FIG. 22 is a sequence chart illustrating exemplary operations of the information sharing system according to the second embodiment. The following describes, with reference to FIG. 22 and screen examples in the IWB 100b and the terminal device 200 illustrated in FIGS. 23A, 23B, 24A, 24B, 25A to 25C, and 26, the operations of the information sharing system according to the second embodiment. In FIGS. 23A, 23B, 25A to 25C, and 26, similar parts are identified by the same reference numerals as those used in FIGS. 1 and 2 and detailed descriptions therefor will be omitted.

When the browser is started in the IWB 100*b*, the browser requests the IWB program that enables the browser to perform processing according to the second embodiment from the server 300 through the network (Step S100). In response to this request, the server 300 loads the IWB program from the program storage module 314 and causes the communication module 310 to transmit the IWB program to the IWB 100*b* through the network (Step S101).

Figure 23A:
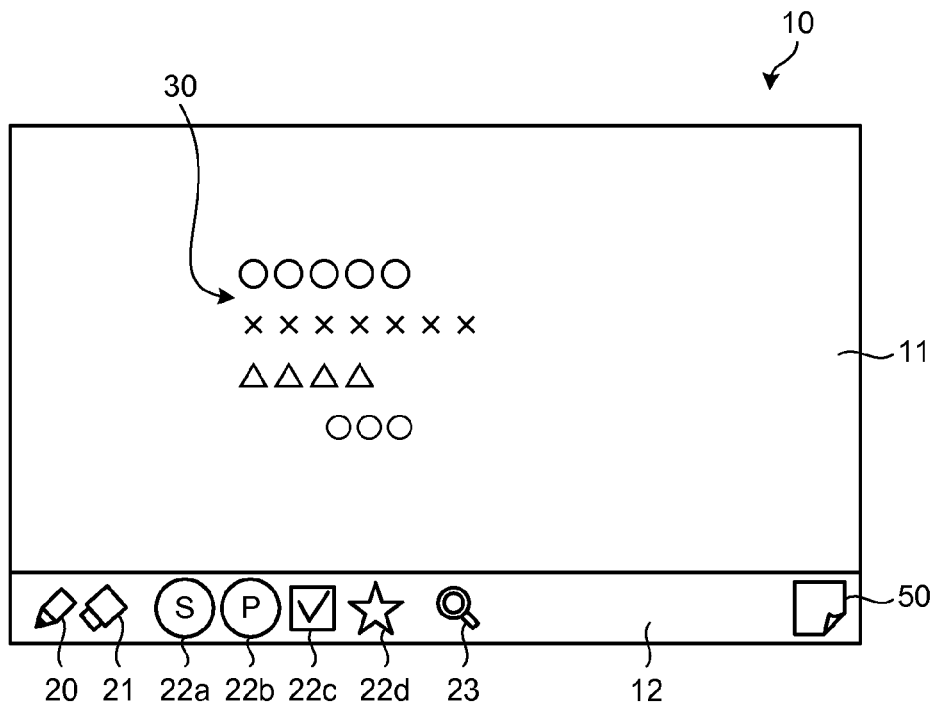
FIGS. 23A and 23B are diagrams illustrating exemplary screens in the IWB and the terminal device according to the second embodiment.

Having received the IWB program from the server 300 through the browser, the IWB 100*b* executes the IWB program on the browser. As illustrated in FIG. 23A, the execution of the IWB program causes the display area 10 in the display unit 124 of the IWB 100*b* to display the drawing area 11 on which an object 30 can be drawn through a user operation and the toolbar 12 on which various types of icons for executing various types of functions are displayed. In the second embodiment, the toolbar 12 further displays an icon image 50 as a symbol for specifying the start of use of the tag.

According to the IWB program, the IWB 100*b* requests identification information (unique ID) unique to the IWB 100*b* from the server 300 (Step S102). In response to this request, the server 300 causes the unique ID generating module 313 to generate the identification information (ID=123) and transmits the generated identification information to the IWB 100*b* (Step S103).

Having acquired the identification information from the server 300, the IWB 100*b* requests an identification image based on the identification information from the server 300 (Step S104). In response to this request, the server 300 causes the identification image generating module 312 to generate an identification image that represents the identification information from the IWB 100*b* encoded by an image. At this time, the server 300 encodes the identification information to which the URL of the server 300 is added, thereby generating the identification image. The identification image is here a QR code (a registered trademark). The identification image is not limited to the QR code (registered trademark) and may be in any other format. Alternatively, the identification image may even be represented by a character string that directly represents the identification information and the URL. The server 300 transmits the generated identification image to the IWB 100*b* (Step S105).

At the time of reception of the identification image from the server 300 at Step S105, the IWB 100*b* polls the server 300 (Step S106) to determine whether there is a message directed to the IWB 100*b* (ID=123).

Figure 23B:
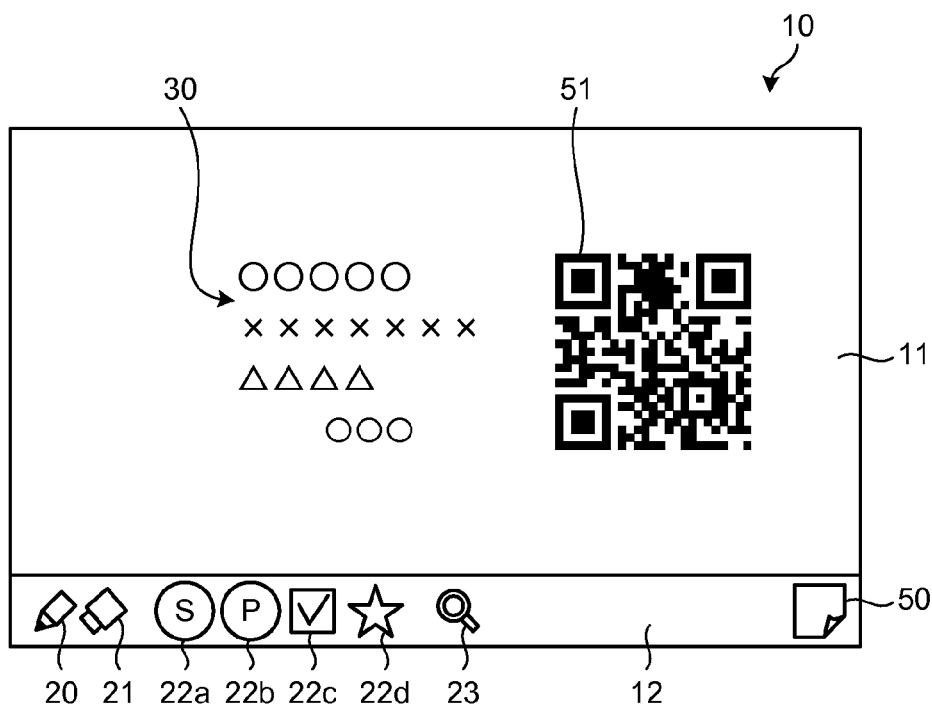

Tapping the icon image 50 through a user operation instructs the IWB 100*b* to initiate the use of the tag according to the second embodiment (Step S107). In response to this instruction, the IWB 100*b* causes the display control module 111 to display an identification image 51 on the display area 10 as illustrated in FIG. 23B (Step S108).

The user who holds the terminal device 200 operates the terminal device 200 to capture (scan) the identification image 51 displayed on the drawing area 11 of the IWB 100*b* (Step S109). For example, in the terminal device 200, a user operation may cause an imaging unit 230 to image an object including the identification image 51 as controlled by the imaging control module 214, thereby acquiring a captured image. For example, the control module 212 analyzes the captured image to extract an identification image portion and then decodes the extracted identification image to thereby acquire the identification information (ID=123) and the URL of the server 300 (Step S110).

The imaging, analyzing, and decoding processes for the identification image, such as those described above, may be executed by an application installed in advance in the terminal device 200.

The terminal device 200 communicates through the browser with the server 300 according to the URL acquired on the basis of the identification image and requests a tag screen for inputting tag information (Step S111). In response to this request, the server 300 reads the tag program from the program storage module 314 and causes the communication module 310 to transmit the tag program to the terminal device 200 through the network (Step S112).

Having received through the browser the tag program from the server 300, the terminal device 200 executes the tag program on the browser. When the tag program is executed, the tag screen is displayed on the display unit 224 of the terminal device 200 (Step S113).

Figure 24A:
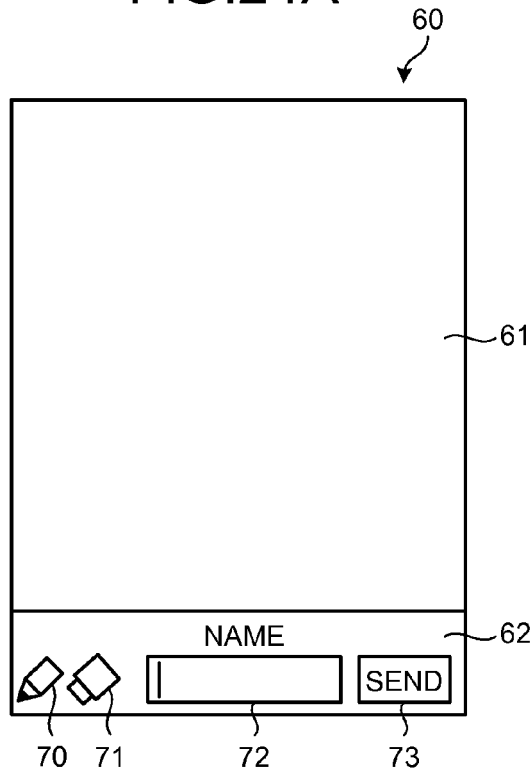
FIGS. 24A and 24B are diagrams illustrating exemplary screens in the IWB and the terminal device according to the second embodiment.
Figure 24B:
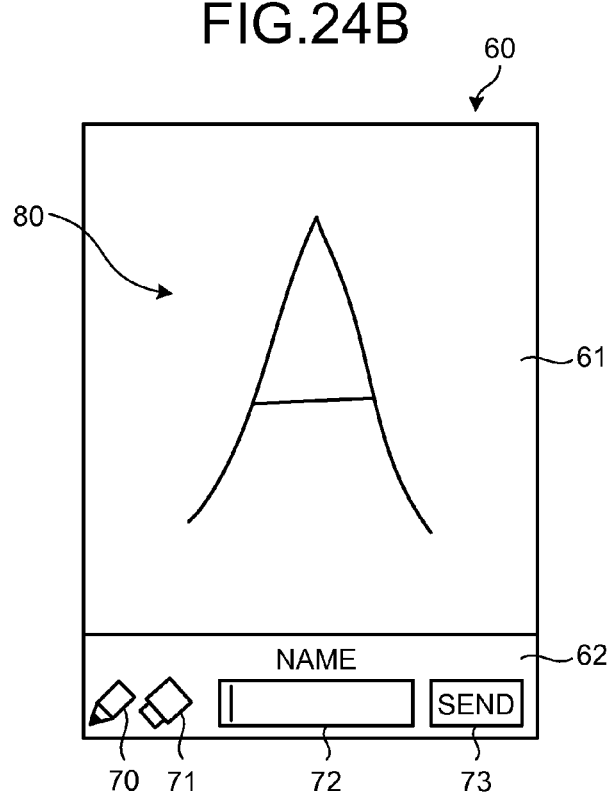

FIGS. 24A and 24B illustrate exemplary tag screens displayed on the display unit 224 of the terminal device 200. In FIG. 24A, a tag information input area 61 and a toolbar 62 are set in a display area 60 in the display unit 224 of the terminal device 200. Tag information can be input (drawn) through a user operation on the tag information input area 61. The toolbar 62 displays various types of icons, an input window, a button, and other components for performing various types of functions.

In the toolbar 62, an icon image 70 is selected when tag information is to be input in the tag information input area 61. For example, the user taps to select the icon image 70 and then traces an area within the tag information input area 61 with, for example, a finger. This action by the user results in an image being drawn along a trajectory traced by the finger. FIG. 24B illustrates an exemplary image represented by an object 80 drawn on the tag information input area 61 by selecting the icon image 70. This object 80 is input to the terminal device 200 as a tag image included in the tag information.

An icon image 71 is selected when part of the image drawn on the tag information input area 61 is to be erased. For example, the user taps to select the icon image 71 and then traces over the object 80 with, for example, a finger. This action by the user results in part of the object 80 being erased along a trajectory traced by the finger.

As with the object 30 described earlier with reference to the first embodiment, the image is described in the SVG format. The SVG format is, however, not the only possible description of an image and a bitmap format may be used. Additionally, the tag information is not limited to what is input as an image as described above. For example, the tag information may be input as text information (character code).

The toolbar 62 further includes a name input part 72. User identification information for identifying the user who has input the tag information may, for example, be input in the name input part 72. For the user identification information, a name or a nickname of the user may be used. The following assumes that the name is used as the user identification information. For example, tapping the name input part 72 starts a character input function installed in advance in the terminal device 200, causing a character input tool such as a keypad to appear on the display unit 224. The user can input his or her name as text information using this character input function. The tag information then additionally includes the information indicating the name.

The toolbar 62 further includes a button 73. The button 73 is used when the tag information input through the tag information input area 61 and the name input part 72 is to be transmitted to the server 300.

The user operates the terminal device 200 to thereby input the tag information in the terminal device 200 as described above (Step S114). In response to an operation on the button 73 (Step S115), the terminal device 200 adds the identification information of the IWB 100*b* acquired from the identification image 51 at Step S109 and Step S110 to the input tag information and transmits the tag information to the server 300 (Step S116). The server 300 receives this tag information.

As described above with reference to Step S106, the IWB 100*b* polls the server 300 to determine whether there is a message addressed to the IWB 100*b*. If the IWB 100*b* finds, through the polling, a message addressed to the IWB 100*b* (ID=123) and transmitted to the server 300 at Step S116 (Step S117), the IWB 100*b* requests this message from the server 300 (Step S118). In response to this request, the server 300 transmits the tag information transmitted from the terminal device 200 to the IWB 100*b* indicated in the tag information (ID=123) transmitted as appended to the tag information (Step S119).

Having received the tag information transmitted from the server 300, the IWB 100*b* displays, on the toolbar 12, an additional icon image that indicates that the tag information has been received (Step S120). For example, the IWB 100*b* stores the received tag information in the display information storage module 115. In the IWB 100*b*, the display control module 111, for example, generates an icon image indicating the received tag information and displays the icon image on the toolbar 12 and causes the icon storage module 114 to additionally store therein the icon image.

The user can display tag information at any desired location within the drawing area 11 by operating the icon image indicating the tag information displayed in the toolbar 12. The following describes, with reference to FIGS. 25A to 25C, operations performed on the icon image that indicates the tag information.

Figure 25A:
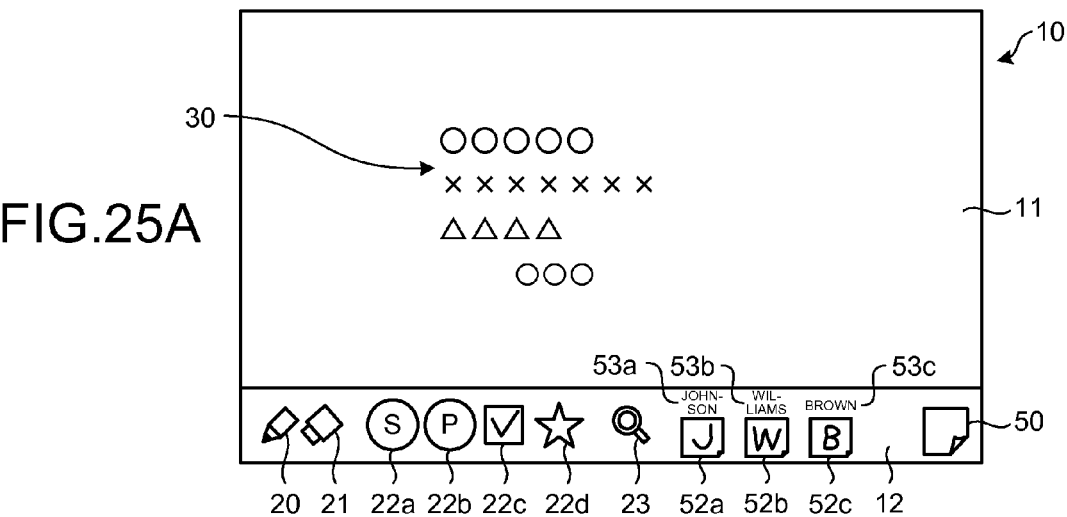
FIGS. 25A to 25C are diagrams illustrating exemplary screens in the IWB according to the second embodiment.
Figure 25B:
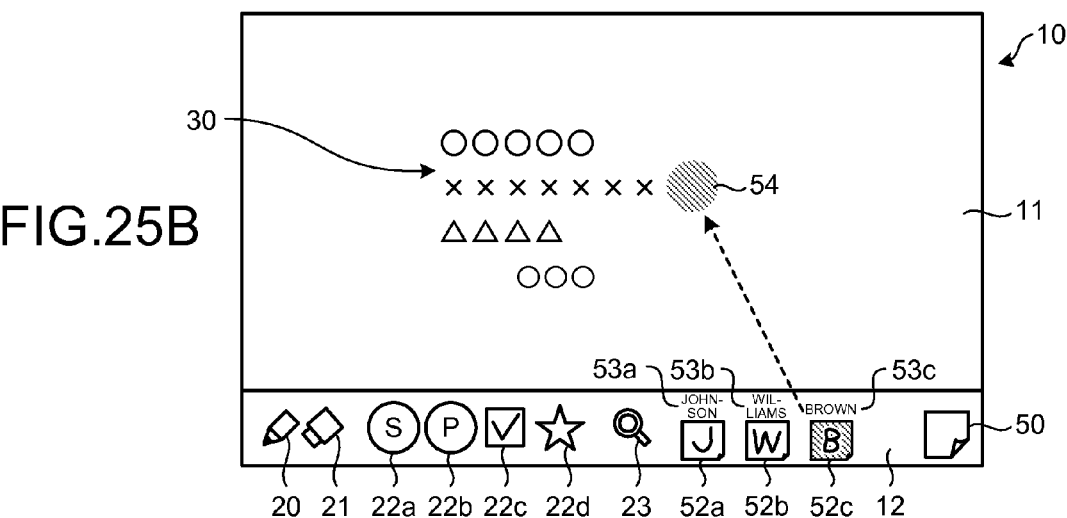

FIG. 25A illustrates an exemplary display of icon images that indicate tag information and are placed on the toolbar 12. In the example of FIG. 25A, the toolbar 12 displays three icon images 52*a*, 52*b*, and 52*c* each being associated with a corresponding one of three pieces of tag information. In the example of FIG. 25A, the display control module 111 generates each of the icon images 52*a*, 52*b*, and 52*c* using a thumbnail image formed by reducing a corresponding tag image. In addition, the toolbar 12 also displays name information 53*a*, 53*b*, and 53*c* indicating names for the respective icon images 52*a*, 52*b*, and 52*c*.

Specifying the icon image 52*a*, 52*b*, or 52*c* on the toolbar 12 and subsequently specifying any desired position within the drawing area 11 allows the tag information associated with the specified icon image to be displayed at the desired position. Assume that, for example, as illustrated in FIG. 25*S*, the user taps the icon image 52*c* and subsequently taps a position 54 within the drawing area 11.

Figure 25C:
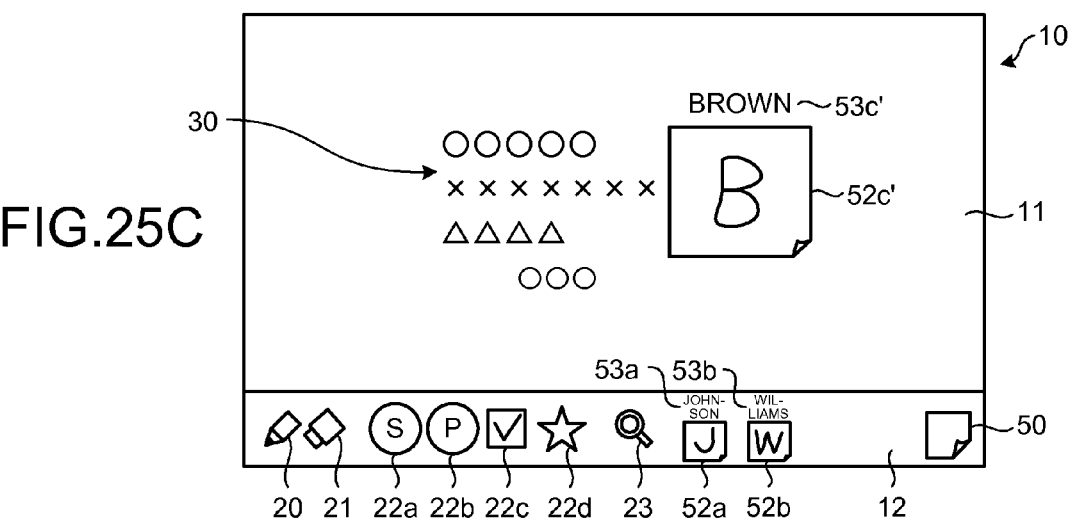
Figure 26:
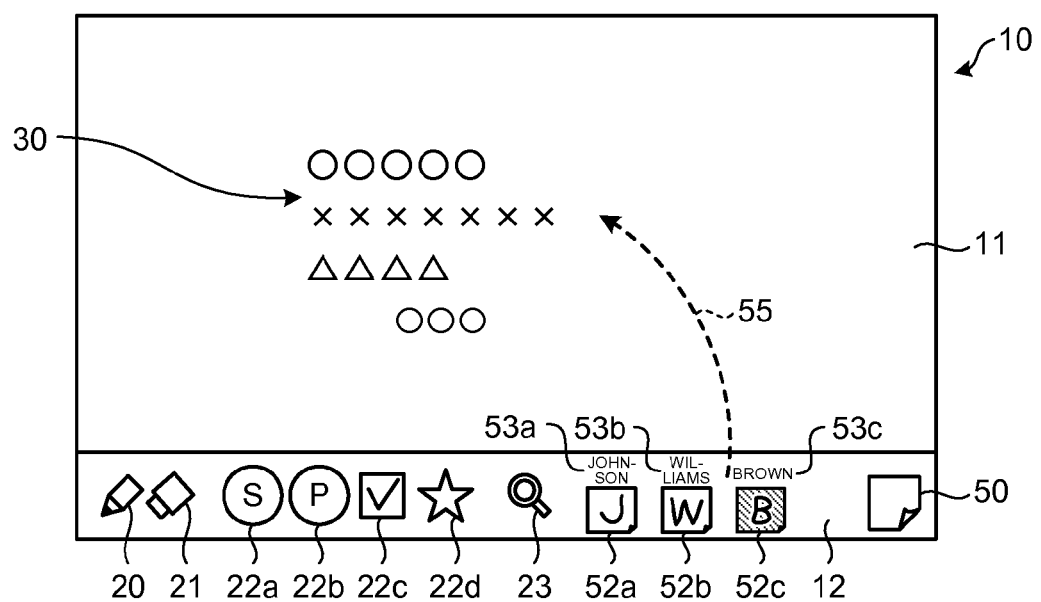
FIG. 26 is an exemplary diagram illustrating how an icon image on a toolbar is moved through a drag-and-drop operation to a desired display position.

In this case, as illustrated in FIG. 25C, a tag image 52*c*' included in the tag information associated with the icon image 52*c* is displayed at the position 54 and name information 53*c*' associated with the tag image 52*c*' displayed near the tag image 52*c*'. The size of the tag image 52*c*' may be set to a preset one. Alternatively, the size of the tag image 52*c*' may even be set dynamically according to the object 80 in the tag image 52*c*'. When the tag image 52*c*' corresponding to the icon image 52*c* is displayed within the drawing area 11, the icon image 52*c* disappears from the toolbar 12.

The tag image 52*c*' may be moved in the drawing area 11 through a drag operation that comes contact, for example, by a finger with the tag image 52*c*' displayed in the drawing area 11 and moves the position of contact while the finger keeps in contact with the tag image 52*c*'. The name information 53' is moved as the tag image 52*c*' associated therewith is moved.

In the above description, the desired icon image 52*c* is tapped and the position 54 at which to display the tag image 52*c*' corresponding to the icon image 52*c* is next tapped, whereby the tag image 52*c*' is displayed at the position 54. This is, however, not limited to the abovementioned example. A drag-and-drop operation may be used, instead. For example, as illustrated by a path 55 in FIG. 26, the icon image 52*c* on the toolbar 12 is moved to the desired position 54 through the drag-and-drop operation and, when the user releases his or her finger from the icon image 52*c*, the tag image 52*c*' is displayed at the position 54. In this case, the icon image 52*c* disappears from the toolbar 12 after the drag-and-drop operation.

As a paper tag can be peeled off at any time, the tag image 52*c*' displayed within the drawing area 11 can be erased from the drawing area 11 according to the user operation. Exemplarily, tapping the tag image 52*c*' displayed within the drawing area 11 twice may erase the tag image 52*c*' from the drawing area 11. At this time, the icon image 52*c* corresponding to the tag image 52*c*' erased from the drawing area 11 is additionally displayed on the toolbar 12.

Alternatively, the tag image 52*c*' may be moved to the outside of the drawing area 11 through the drag-and-drop operation to thereby erase the tag image 52*c*' from the drawing area 11. Also in this case, the icon image 52*c* corresponding to the erased tag image 52*c*' is to be re-displayed in the toolbar 12. Still alternatively, the procedure described with reference to FIG. 26 may be reversed. Specifically, the tag image 52*c*' displayed within the drawing area 11 may be moved through the drag-and-drop operation onto the toolbar 12, to thereby erase the tag image 52*c*' from the drawing area 11 and display the icon image 52*c* corresponding to the tag image 52*c*' in the toolbar 12.

Thus, in the second embodiment, the tag information input to the terminal device 200 can be displayed on the IWB 100*b*. The icon images 52*a* to 52*c*, each indicating a specific piece of tag information, are displayed on the toolbar 12 and moving any one of the icon images 52*a* to 52*c* into the drawing area 11 allows the corresponding tag information to be displayed within the drawing area 11. These arrangements can achieve the function of the tag on the IWB 100*b*, thus enhancing convenience of the IWB 100*b*.

The second embodiment may be combined with the first embodiment described earlier to be implemented.

Modification of the Second Embodiment

The following describes a modification of the second embodiment. In the second embodiment described above, when the IWB 100*b* receives tag information transmitted from the terminal device 200, the icon image indicating the tag information is added to the toolbar 12 and the IWB 100*b* displays a tag image within the drawing area 11 as the icon image is specified. In contrast, in the modification of the second embodiment, when the IWB 100*b* receives tag information transmitted from the terminal device 200, the IWB 100*b* directly displays the tag image included in the received tag information within the drawing area 11.

It is noted that the modification of the second embodiment can use the information sharing system, the IWB 100*b*, the terminal device 200, and the server 300 described in the second embodiment with reference to FIGS. 16 to 21, as they are, and detailed descriptions therefor will be omitted.

The following describes a process for displaying the tag image in the modification of the second embodiment in greater detail. Reference is made to the sequence chart of FIG. 22. In the modification of the second embodiment, processes of from Step S100 to Step S119 are performed as those in the second embodiment described above. If the IWB 100*b* receives tag information transmitted from the terminal device 200 via the server 300 (Step S119), the IWB 100*b* displays a tag image included in the tag information at a predetermined position within the drawing area 11 at Step S120.

FIG. 27A illustrates an exemplary display area 10 in which no tag images are displayed. In FIG. 27A, and FIGS. 27B and 27C to be described later, like or similar parts are identified by the same reference numerals as those used in FIGS. 25A to 25C and detailed descriptions therefor will be omitted.

FIG. 27B illustrates an exemplary display of a tag image 56 included in the received tag information, displayed within the drawing area 11 in the IWB 100*b*. When the IWB 100*b* receives tag information from the terminal device 200 in a condition of the display area 10 as illustrated in FIG. 27A, the IWB 100*b* displays the tag image 56 at the predetermined position in the drawing area 11, so that the display area 10 is as illustrated in FIG. 27B. For example, the IWB 100*b* displays the tag image 56 on a position apart from the outer edges of the drawing area 11 by predetermined intervals. In the example of FIG. 27B, the tag image 56 is displayed at intervals of a distance $x_D$ and a distance $y_D$ from a left end and an upper end, respectively, of the drawing area 11.

At this time, the IWB 100*b* sets predetermined values for the distance $x_D$ and the distance $y_D$. For example, the IWB 100*b* can set the distance $x_D$ and the distance $y_D$ on the basis of the size of the display unit of the IWB 100*b* and the size of either the display area 10 or the drawing area 11 displayed in the display unit. A fixed value may even be set for each of the distance $x_D$ and the distance $y_D$.

In addition, as illustrated in FIG. 27B, the IWB 100*b* displays name information 57 associated with the tag image 56 near the tag image 56. Alternatively, the IWB 100*b* may display the name information 57 inside the tag image 56 associated therewith.

The IWB 100*b* is capable of displaying a plurality of tag images 56 within the drawing area 11. The IWB 100*b* may, in this case, display the tag images 56 with part thereof overlapping each other by shifting the position of the upper left corner of each tag image 56 by a slight distance in an X direction and a Y direction. Alternatively, the IWB 100*b* may display the tag images 56, each being in line with each other and not overlapping each other. Such display modes may still be changed over from one to another. Additionally, the tag image 56 may even be moved through the drawing area 11 by, for example, a drag operation.

The IWB 100*b* can erase the tag image 56 from the drawing area 11 and display an icon image corresponding to the tag image 56 on the toolbar 12. For example, as illustrated in FIG. 27C, a user may tap the tag image 56 within the drawing area 11 and subsequently tap a blank portion in the toolbar 12. In response to the foregoing operation, the IWB 100*b* erases the tag image 56 from the drawing area 11 and displays an icon image 56' and name information 57' corresponding to the tag image 56 at corresponding positions on the toolbar 12. Alternatively, the IWB 100*b* may, in response to a drag-and-drop operation performed by the user, move the tag image 56 within the drawing area 11 to the toolbar 12, thereby to erase the tag image 56 from the drawing area 11 and to display the tag image 56' and the name information 57' corresponding to the tag image 56 on the toolbar 12.

Bypassing the toolbar 12 and directly displaying the tag image included in the tag information transmitted from the terminal device 200 in the drawing area 11 enable the user to determine details of each tag image substantially on a real-time basis.

The present invention can achieve an effect of providing an IWB that offers even greater convenience.

Aspect 1. An information sharing system comprising:
an information processing system including at least one information processing apparatus;
a terminal device; and
a display device provided with a display unit that displays an image;
the display device including:
a first identification information acquiring unit that acquires identification information for identifying the display device on a network; and
a display controller that controls display of an image on the display unit;
the terminal device including:
an input unit that receives tag information through a user operation;
a second identification information acquiring unit that acquires the identification information from the display device; and
a transmitting unit that transmits information, obtained by adding the identification information acquired from the second identification information acquiring unit to the tag information, to the information processing system;
the information processing system including:
a communication controller that communicates with the display device through the network based on the identification information transmitted from the terminal device and transmits the tag information added to the identification information to the display device identified with the identification information;
the display controller:
displaying a symbol indicating the tag information transmitted from the information processing system in a first display area of the display unit and displaying the tag information corresponding to the symbol through a user operation for specifying the symbol in a second display area of the display unit.

Aspect 2. The information sharing system according to aspect 1, wherein the display controller displays the tag information corresponding to the symbol at a specified position in the second display area through a user operation.

Aspect 3. The information sharing system according to aspect 1, wherein the display controller erases the symbol corresponding to the tag information from the first display area when the tag information is displayed in the second display area.

Aspect 4. The information sharing system according to aspect 1, wherein the tag information includes character information and user identification information for identifying a user having input the character information, the character information and the user identification information being input to the input unit.

Aspect 5. The information sharing system according to aspect 4, wherein the input unit receives the character information as an image.

Aspect 6. The information sharing system according to aspect 4, wherein the input unit receives the character information using a character code.

Aspect 7. The information sharing system according to aspect 1, wherein the information processing system further includes an encoded image generating unit that generates an encoded image obtained by encoding the identification information transmitted from the display device, the first identification information acquiring unit requests the encoded image, obtained by encoding the identification information transmitted to the information processing system, from the information processing system and causes the display unit to display the encoded image transmitted from the information processing system as requested, and the second identification information acquiring unit includes:
an imaging unit that images an object, and
a decoding unit that decodes the encoded image taken by the imaging unit and extracts the identification information.

Aspect 8. An information sharing method performed by an information sharing system that comprises an information processing system including at least one information processing apparatus, a terminal device, and a display device provided with a display unit that displays an image, the information sharing method comprising:

first acquiring, by the display device, identification information for identifying the display device on a network;

second acquiring, by the terminal device, the identification information from the display device;

transmitting, by the terminal device, information, obtained by adding the identification information acquired at the second acquiring to tag information input through a user operation, to the information processing system; and communicating, by the information processing system, with the display device through the network based on the identification information transmitted from the terminal device and transmitting the tag information added to the identification information to the display device identified with the identification information;

the display device:
displaying a symbol indicating the tag information transmitted from the information processing system in a first display area of the display unit and displaying the tag information corresponding to the symbol through a user operation for specifying the symbol in a second display area of the display unit.

Aspect 9. An information processing apparatus coupled, through a network, to a first computer serving as a display device provided with a display unit that displays an image and to a second computer serving as a terminal device, the information processing apparatus comprising:

a program transmitting unit that transmits:
a first program for causing the first computer to function as an identification information acquiring unit and a display controller to the first computer, the identification information acquiring unit acquiring identification information for identifying the first computer on the network, the display controller controlling display of an image on the display unit, displaying a symbol indicating tag information transmitted from the information processing apparatus in a first display area of the display unit, and displaying the tag information corresponding to the symbol through a user operation for specifying the symbol in a second display area of the display unit, and a second program for causing the second computer to function as a transmitting unit to the second computer, the transmitting unit transmitting information, obtained by adding the identification information acquired from the second computer to the tag information input through a user operation, to the information processing system; and a communication controller that communicates with the first computer through the network based on the identification information transmitted from the second computer and transmits the tag information added to the identification information to the first computer identified with the identification information.

Aspect 10. An information processing method performed by an information processing apparatus coupled, through a network, to a first computer serving as a display device provided with a display unit that displays an image and to a second computer serving as a terminal device, the information processing method comprising:

transmitting a first program for causing the first computer to function as an identification information acquiring unit and a display controller to the first computer, the identification information acquiring unit acquiring identification information for identifying the first computer on the network, the display controller controlling display of an image on the display unit, displaying a symbol indicating tag information transmitted from the information processing apparatus in a first display area of the display unit, and displaying the tag information corresponding to the symbol through a user operation for specifying the symbol in a second display area of the display unit;

transmitting a second program for causing the second computer to function as a transmitting unit to the second computer, the transmitting unit transmitting information, obtained by adding the identification information acquired from the second computer to the tag information input through a user operation, to the information processing system; and communicating with the first computer through the network based on the identification information transmitted from the second computer and transmitting the tag information added to the identification information to the first computer identified with the identification information.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing apparatus for displaying, on a display area of a display device, a sub-image of a first image, the first image being within a first area, the sub-image being within a second area, the second area being within the first area, the information processing apparatus comprising:
   memory storing computer-executable instructions; and
   one or more processors configured to execute the computer-executable instructions such that the one or more processors are configured to,
   receive user input selecting a first symbol, from among a plurality of symbols located outside the first area,
   receive user input identifying a position in the sub-image within the second area,
   store the identified position,
   display, in the display area, the selected first symbol at the identified position on the sub-image, in response to the user input identifying the position,
   change a size of the second area with respect to the first area,
   resize the sub-image within the second area at such a display magnification that the resized sub-image fits in a size of the display area, and
   display the resized sub-image in the display area,
   the first image including at least one object,
   wherein the one or more processors are further configured to execute the computer-executable instructions such that the one or more processors are configured to,
   erase the first symbol and display at the identified position a second symbol for indicating the identified position in the display area when the display magnification is less than a threshold as a result of the resizing, and
   display the first symbol at the identified position in the display area when the display magnification is equal to or greater than the threshold.

2. The information processing apparatus according to claim 1, wherein the one or more processors are further configured to execute the computer-executable instructions such that the one or more processors are configured to change the size of the second area to a size that includes all objects in the first image in response to a single user input.

3. The information processing apparatus according to claim 1, wherein, the one or more processors are further configured to execute the computer-executable instructions such that, in response to user input specifying the second symbol, the one or more processors center a position indicated by the second symbol in the display area and change the size of the second area to a first size to display the sub-image within the second area in the display area.

4. The information processing apparatus according to claim 1,
   wherein the one or more processors are further configured to execute the computer-executable instructions such that the one or more processors are configured to,
   store, in a symbol storage, a plurality of types of first symbols and a plurality of types of second symbols corresponding to the types of the first symbols, and
   wherein, the one or more processors are further configured to execute the computer-executable instructions such that, when the display magnification is less than the threshold as a result of a conversion of the size of the second area by the one or more processors,
   the second symbol displayed at the position of the erased first symbol in the display area has a type corresponding to a type of the erased first symbol.

5. An information processing method for displaying, on a display area of a display device, a sub-image of a first image, the first image being within a first area, the sub-image being within a second area, the second area being within the first area, the method comprising:
   receiving user input selecting a first symbol, from among a plurality of symbols located outside the first area;
   receiving user input identifying a position in the sub-image within the second area;
   storing the identified position;
   displaying, in the display area, the selected first symbol at the identified position on the sub-image, in response to the user input identifying the position;
   changing a size of the second area with respect to the first area;
   resizing the sub-image within the second area at such a display magnification that the resized sub-image fits in a size of the display area; and
   displaying the resized sub-image in the display area,
   the first image including at least one object,
   wherein,
   when the display magnification is less than a threshold as a result of the resizing, the first symbol is erased and a second symbol for indicating the identified position is displayed at the identified position in the display area, and
   when the display magnification is equal to or greater than the threshold, the first symbol is displayed at the identified position in the display area.

6. The information processing method according to claim 5, wherein the changing includes changing the size of the second area to a size that includes all objects in the first image in response to a single user input.

7. The information processing method according to claim 5, wherein, when user input specifies the second symbol, the resizing includes centering a position indicated by the second symbol in the display area and changing the size of the second area to a first size to display the sub-image within the second area in the display area.

8. The information processing method according to claim 5, further comprising:
   storing a plurality of types of first symbols and a plurality of types of second symbols corresponding to the types of the first symbols,
   wherein, when the display magnification is less than the threshold as a result of a conversion of the size of the second area,
   the second symbol displayed at the position of the erased first symbol in the display area has a type corresponding to a type of the erased first symbol.

9. A non-transitory computer-readable recording medium that stores computer-executable instructions that, when executed by a computer, cause the computer to perform operations for displaying, on a display area of a display device, a sub-image of a first image, the first image being within a first area, the sub-image being within a second area, the second area being within the first area, the operations including,
    receiving user input selecting a first symbol, from among a plurality of symbols located outside the first area,
    receiving user input identifying a position in the sub-image within the second area,
    storing the identified position,
    displaying, in the display area, the selected first symbol at the identified position on the sub-image, in response to the user input identifying the position,
    changing a size of the second area with respect to the first area,
    resizing the sub-image within the second area at such a display magnification that the resized sub-image fits in a size of the display area, and
    displaying the resized sub-image in the display area,
    the first image including at least one object,
    wherein,
    when the display magnification is less than a threshold as a result of the resizing, the first symbol is erased and a second symbol for indicating the identified position is displayed at the identified position in the display area, and
    when the display magnification is equal to or greater than the threshold, the first symbol is displayed at the identified position in the display area.

10. The computer-readable recording medium according to claim 9, wherein the changing includes changing the size of the second area to a size that includes all objects in the first image in response to a single user input.

11. The computer-readable recording medium according to claim 9, wherein, when user input specifies the second symbol, the resizing includes centering a position indicated by the second symbol in the display area and changing the size of the second area to a first size to display the sub-image within the second area in the display area.

12. The computer-readable recording medium according to claim 9,
    wherein the operations further include,
        storing a plurality of types of first symbols and a plurality of types of second symbols corresponding to the types of the first symbols, and
    wherein, when the display magnification is less than the threshold as a result of a conversion of the size of the second area, the second symbol displayed at the position of the erased first symbol in the display area has a type corresponding to a type of the erased first symbol.

* * * * *